(12) United States Patent
Washio

(10) Patent No.: US 9,008,456 B2
(45) Date of Patent: Apr. 14, 2015

(54) IMAGE PROCESSING APPARATUS HAVING A THINNING UNIT AND A SMOOTHING UNIT, AND IMAGE PROCESSING METHOD

(75) Inventor: Koji Washio, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 261 days.

(21) Appl. No.: 13/534,298

(22) Filed: Jun. 27, 2012

(65) Prior Publication Data

US 2013/0004099 A1    Jan. 3, 2013

(30) Foreign Application Priority Data

Jun. 29, 2011  (JP) ................................. 2011-143682

(51) Int. Cl.
  *G06K 9/40* (2006.01)
  *G06T 5/20* (2006.01)
  *G06T 5/00* (2006.01)

(52) U.S. Cl.
  CPC . *G06T 5/20* (2013.01); *G06T 5/002* (2013.01); *G06T 2207/10024* (2013.01); *G06T 2207/20012* (2013.01); *G06T 2207/20192* (2013.01)

(58) Field of Classification Search
  USPC .......... 382/176, 195, 254, 256, 266; 358/3.27
  See application file for complete search history.

(56) References Cited

U.S. PATENT DOCUMENTS 6,608,296 B1 * 8/2003 Toyoda et al. ............. 250/208.1
2008/0074699 A1 * 3/2008 Washio ........................ 358/2.99

FOREIGN PATENT DOCUMENTS

JP    7-334672 A    12/1995
JP    4225337 B2    12/2008

* cited by examiner

*Primary Examiner* — Chan Park
*Assistant Examiner* — Eueng-Nan Yeh
(74) *Attorney, Agent, or Firm* — Holtz, Holtz, Goodman & Chick PC

(57) ABSTRACT

An image processing apparatus includes a smoothing processing unit which performs smoothing processing, a thinning processing unit which performs thinning processing, an edge direction determination unit which determines an edge direction with respect to each pixel of the image data and a blending processing unit which decides a pixel value of each pixel of when the thinning processing and the smoothing processing are realized at same time. In the image processing apparatus, the blending processing unit decides a pixel value of a target pixel of when the thinning processing and the smoothing processing are realized at the same time depending on a combination of whether the thinning processing is performed or not and whether the smoothing processing is performed or not on the target pixel.

10 Claims, 18 Drawing Sheets

FIG.2

| 01 | 02 | 03 | 04 | 05 | 06 | 07 |
|----|----|----|----|----|----|----|
| 08 | 09 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | 32 | 33 | 34 | 35 |
| 36 | 37 | 38 | 39 | 40 | 41 | 42 |
| 43 | 44 | 45 | 46 | 47 | 48 | 49 |

FIG.4

M:dST(-), dSMT(-)

- - - - - - LINE IMAGE OF EDGE
AFTER SMOTTHING PROCESSING
·············· LINE IMAGE OF EDGE
AFTER THINNING PROCESSING

M:dST(+), dSMT(+)

- - - - - - LINE IMAGE OF EDGE
AFTER SMOTTHING PROCESSING
·············· LINE IMAGE OF EDGE
AFTER THINNING PROCESSING

M:dST(-)
N:dSMT(+)

- - - - - - LINE IMAGE OF EDGE
AFTER SMOTTHING PROCESSING
·········· LINE IMAGE OF EDGE
AFTER THINNING PROCESSING

M:dST(+)
N:dSMT(-)

- - - - - - LINE IMAGE OF EDGE
AFTER SMOTTHING PROCESSING
·········· LINE IMAGE OF EDGE
AFTER THINNING PROCESSING

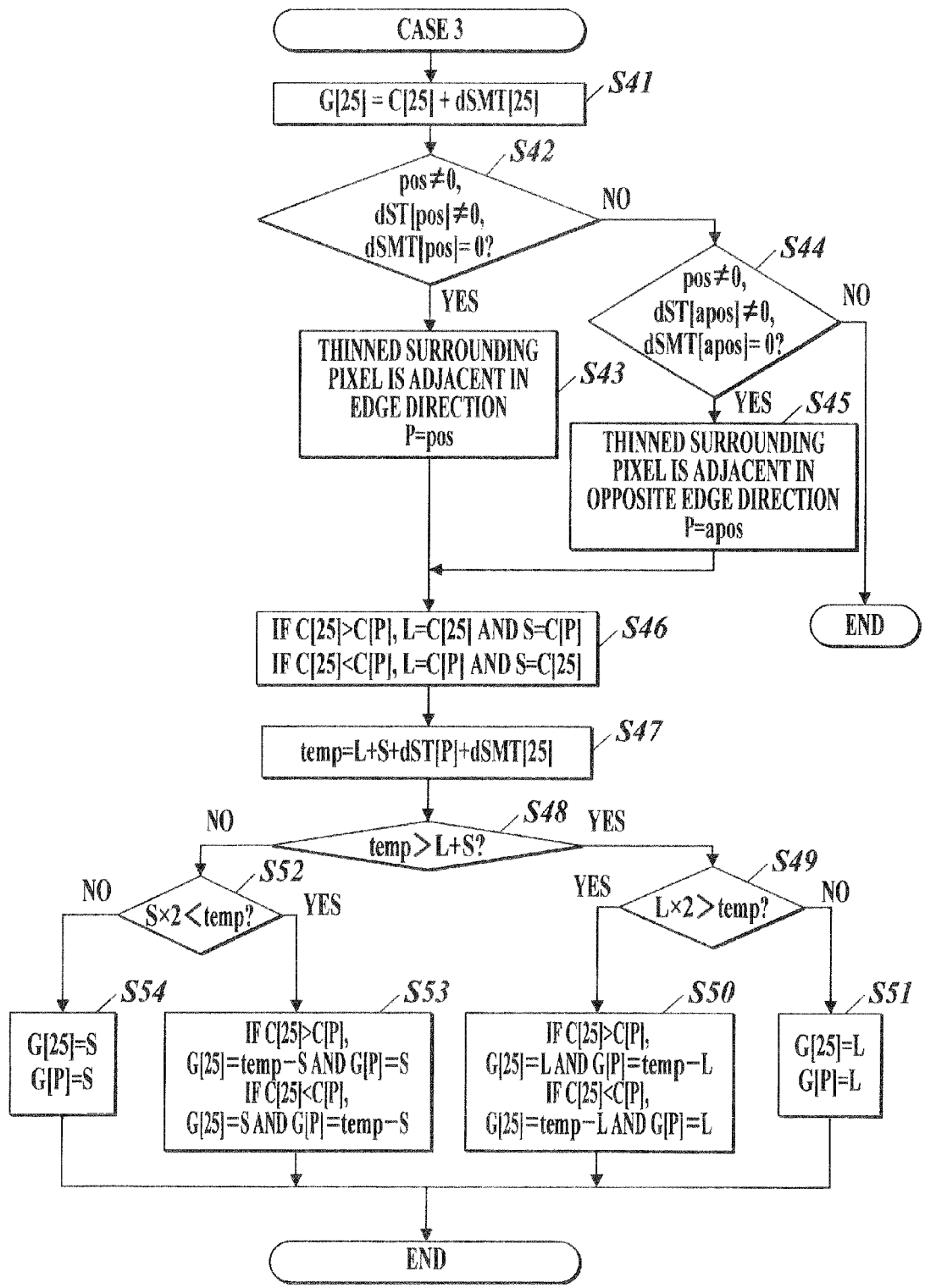

M:dSMT(+)
N:dST(-)

- - - - - - LINE IMAGE OF EDGE
AFTER SMOTTHING PROCESSING
·········· LINE IMAGE OF EDGE
AFTER THINNING PROCESSING

M:dSMT(-)
N:dST(+)

- - - - - - LINE IMAGE OF EDGE
AFTER SMOTTHING PROCESSING
·········· LINE IMAGE OF EDGE
AFTER THINNING PROCESSING

N:dST(-), dSMT(-)

N:dST(+), dSMT(+)

- - - - - - LINE IMAGE OF EDGE AFTER SMOTTHING PROCESSING
- - - - - - - LINE IMAGE OF EDGE AFTER THINNING PROCESSING

- - - - - - LINE IMAGE OF EDGE AFTER SMOTTHING PROCESSING
- - - - - - - LINE IMAGE OF EDGE AFTER THINNING PROCESSING

ORIGINAL IMAGE

DESIRED IMAGE

SMOOTHING PROCESSING ONLY

THINNING PROCESSING ONLY

SWITCH BETWEEN SMOOTHING PROCESSING AND THINNING PROCESSING

SET PIXEL VALUE TO BE SMALLER IN SMOOOTHING PROCESSING

IMAGE PROCESSING APPARATUS HAVING A THINNING UNIT AND A SMOOTHING UNIT, AND IMAGE PROCESSING METHOD

BACKGROUND OF THE INVENTION

1. Field of the Invention

The present invention relates to an image processing apparatus and an image processing method.

2. Description of Related Art

Thinning processing is known as an image processing. In thinning processing, sharpness of character and the like is improved by decreasing the pixel values at the edges of the characters and the like.

Smoothing processing is another image processing to be performed on edges. In smoothing processing, edges of an oblique line portion can be smoothed visually by making the edges be halftone by increasing or decreasing pixel values at the edges of the oblique line portion or a character and the like.

Both of thinning processing and smoothing processing are performed on edges. However, it has been difficult to perform the two processing at the same time because the objects of the two processing are different. For example, although a sharp and smooth character can be obtained when thinning processing is performed on straight line portions and smoothing processing is performed on oblique line portions of a character, it is difficult to obtain such a character by a method of detecting structures of the straight line portions and the oblique line portions and switching between thinning processing and smoothing processing depending on the detected structure (see Japanese Patent Application Laid Open Publication No. H7-334672, for example). This is because there are pixels belonging to both straight line portion and the oblique line portion, causing an unexpected result such as increase in pixel value due to smoothing processing although thinning, not smoothing, should have been the appropriate processing.

In response to this, the applicant developed an image processing apparatus to realize thinning processing and smoothing processing at the same time (see Japanese Patent No. JP 4225337, for example). According to this image processing apparatus, results of smoothing processing and thinning processing are stored as change amounts from the original pixel value. When a pixel value obtained by adding the stored change amounts to the original pixel value exceeds that maximum value or becomes a negative value, the excess or shortfall is adjusted by using the pixel value of an adjacent pixel which has a predetermined positional relation with the target pixel. By adjusting the processing results of thinning processing and smoothing processing not only in the target pixel by in two pixels which the target pixel and an adjacent pixel thereof, the two processing results can be absorbed reasonably.

According to the above described image processing apparatus, common templates are used in smoothing processing and thinning processing. In each template, the positional relation between the target pixel and an adjacent pixel to be used for adjusting the pixel value of the target pixel is defined, and in addition, change amounts in pixel value due to smoothing processing and thinning processing of each of the target pixel and the adjacent pixel are defined. A pair of target pixel and adjacent pixel, which are the pixels in which pixel value adjustment is to be performed, is decided by carrying out template matching, and pixel values of the target pixel and the adjacent pixel when the two processing are performed at the same time are obtained.

In such template method, thinning processing and smoothing processing are performed in a unified manner by using the templates. That is, the templates need to be newly prepared in order to switch between smoothing processing and thinning processing because there is no border between thinning processing and smoothing processing in the templates and the two processing are not independent from each other. Although the processing may be switched without newly preparing the templates, an appropriate processing result cannot be obtained because the judgment criteria of edges in each of thinning processing and smoothing processing differs from each other.

However, there are various processing methods in thinning processing and smoothing processing, and it will be convenient if the processing can be switched between each other.

SUMMARY OF THE INVENTION

It is, therefore, a main object of the present invention is to make thinning processing and smoothing processing independent from each other when realizing the thinning processing and the smoothing processing at the same time.

In order to achieve the above object, according to a first aspect of the present invention, there is provided an image processing apparatus including a smoothing processing unit which performs smoothing processing on image data, a thinning processing unit which performs thinning processing on the image data, an edge direction determination unit which determines an edge direction with respect to each pixel of the image data and a blending processing unit which decides a pixel value of each pixel of when the thinning processing and the smoothing processing are realized at same time, and the blending processing unit decides a pixel value of a target pixel of when the thinning processing and the smoothing processing are realized at the same time depending on a combination of whether the thinning processing is performed or not and whether the smoothing processing is performed or not on the target pixel by using pixel values of the target pixel and a surrounding pixel of the target pixel, change amounts in pixel value due to the smoothing processing, change amounts in pixel value due to the thinning processing and the edge direction which is determined with respect to the target pixel.

According to a second aspect of the present invention, there is provided an image processing method including smoothing of image data, thinning of the image data, determining an edge direction with respect to each pixel of the image data; and blending to decide a pixel value of each pixel of when the thinning processing and the smoothing processing are realized at same time, and in the blending, a pixel value of a target pixel of when the thinning processing and the smoothing processing are realized at the same time is decided depending on a combination of whether the thinning processing is performed or not and whether the smoothing processing is performed or not on the target pixel by using pixel values of the target pixel and a surrounding pixel of the target pixel, change amounts in pixel value due to the smoothing processing, change amounts in pixel value due to the thinning processing and the edge direction which is determined with respect to the target pixel.

BRIEF DESCRIPTION OF THE DRAWINGS

The present invention will become more fully understood from the detailed description given hereinafter and the appended drawings. However, these shall not limit the present invention, and wherein:

FIG. 2 is a diagram showing a region of 7×7 pixels;

FIG. 4 is an example of templates which are used for detecting a pattern of an edge to be smoothed;

FIG. 15 is a flowchart of processing performed by the pixel value deciding unit in case 3;

DESCRIPTION OF THE PREFERRED EMBODIMENTS

Hereinafter, an embodiment of an image processing apparatus and an image processing method according to the present invention will be explained with reference to the drawings.

Figure 1:
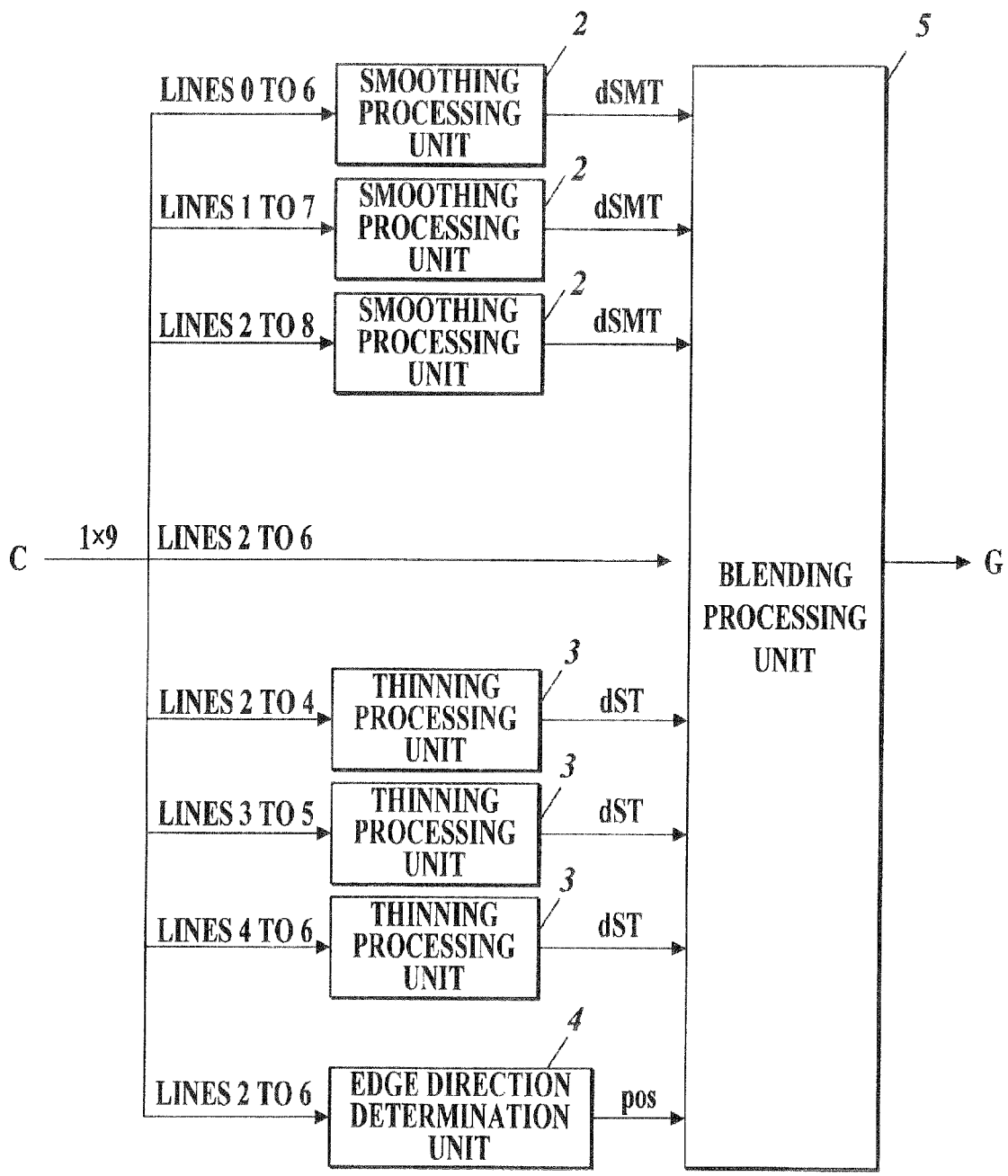
FIG. 1 is a configuration view of an image processing apparatus according to the embodiment.

FIG. 1 shows a configuration of an image processing apparatus 1 according to the embodiment.

The image processing apparatus 1 includes a smoothing processing unit 2, a thinning processing unit 3, an edge direction determination unit 4 and a blending processing unit 5 as shown in FIG. 1.

The image processing apparatus 1 includes a line memory for total of nine pixels of lines 0 to 8 in the sub-scanning direction and image data is input to and stored in the line memory while shifting by one pixel in the main scanning direction every clock. The image data is 8 bit and the value range of the pixel value is from 0 to 255. In a case of a color image, image data of four colors which are Y (yellow), M (magenta), C (cyan) and K (black) is input.

The smoothing processing unit 2 performs smoothing processing on each pixel of the image data. Smoothing processing is also called anti-aliasing processing.

Smoothing processing is performed in units of 7×7 pixels. The smoothing processing unit 2 obtains 7×7 pixels from the line memory by storing image data of seven lines for seven clocks, that is, for seven pixels in the main scanning direction.

Three smoothing processing units 2 are provided. Image data of lines 0 to 6 is input to the upper smoothing processing unit 2, image data of lines 1 to 7 is input to the middle smoothing processing unit 2, and image data of lines 2 to 8 is input to the lower smoothing processing unit 2.

FIG. 2 shows a region of 7×7 pixels which is input to the middle smoothing processing unit 2. In FIG. 2, the pixels are respectively assigned with identification numbers 01 to 49 to indicate the pixel locations.

Each smoothing processing unit 2 performs smoothing processing on the pixel located at the center of the 7×7 pixels, and calculates and outputs a change amount dSMT in pixel value due to smoothing processing. That is, pixel values of 1×7 pixels are input to each smoothing processing unit 2 every clock, and change amounts dSMT in pixel value of 1×3 pixels (pixels of identification numbers 18, 25 and 32) are output.

Figure 3:
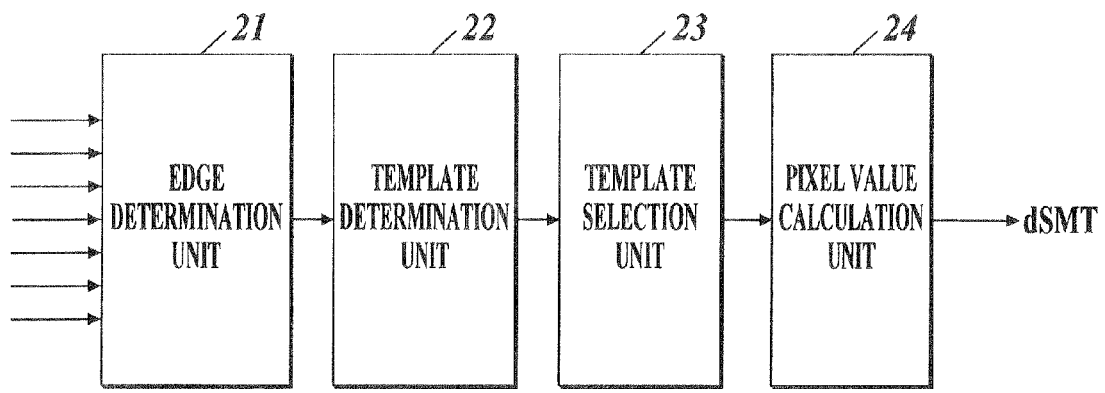
FIG. 3 is a configuration view of a smoothing processing unit.

Each smoothing processing unit 2 includes an edge determination unit 21, a template determination unit 22, a template selection unit 23 and a pixel value calculation unit 24 as shown in FIG. 3.

Though each smoothing processing unit 2 performs the processing on pixels at different location, the processing is the same in content. Therefore, smoothing processing will be explained by taking the middle smoothing processing unit 2 which performs smoothing processing on the target pixel of identification number 25 as an example.

The edge determination unit 21 determines whether an edge is included in the 7×7 pixels because the target to be smoothed by smoothing processing, that is, the pixel in which the pixel value thereof is to be changed is an edge of a character or a line drawing.

The edge determination unit 21 calculates a difference in pixel values between two adjacent pixels. If the difference is equal to or greater than threshold value th1, the edge determination unit 21 determines that there is an edge between the two pixels. If the difference is smaller than the threshold value th1, the edge determination unit 21 determines that there is no edge between the two pixels. Th1 is a threshold value which is determined in advance for the edge determination. The difference is calculated in absolute value and the two pixels whose difference is calculated are pixels adjacent to each other in a predetermined positional relationship.

The following is combinations of two pixels A and B whose difference is calculated. Each combination is expressed by "identification number of pixel A—identification number of pixel B".

03-10, 04-11, 05-12, 10-17, 10-18, 11-17, 11-18, 11-19, 12-18, 12-19, 15-16, 16-17, 16-24, 17-18, 17-23, 17-24, 18-19, 18-24, 18-25, 18-26, 19-20, 19-26, 19-27, 20-21, 20-26, 22-23, 23-24, 23-31, 24-25, 24-30, 24-31, 24-32, 25-26, 25-32, 26-27, 26-32, 26-33, 26-34, 27-28, 27-33, 29-30, 30-31, 31-32, 31-38, 31-39, 32-33, 32-38, 32-39, 32-40, 33-34, 33-39, 33-40, 34-35, 38-45, 39-46, 40-47.

When the edge determination unit 21 determines that there is an edge, the edge determination unit 21 outputs V[AB]=1. When the edge determination unit 21 determines that there is no edge, the edge determination unit 21 outputs V[AB]=0. In V[AB], A and B indicate two pixels whose difference was calculated, and the value of identification numbers 01 to 49 of each pixel A and B is input. For example, when it is determined that there is an edge between pixels A and B from the difference between the pixel A of identification number 03 and the pixel B of identification number 10, V[0310]=1 is output.

There are total of 56 combinations of pixels A and B, and total of 56 subtraction results need to be obtained for one clock as an arithmetic circuit. However, the number of subtraction can be reduced by optimizing the arithmetic circuit. The arithmetic circuit outputs the arithmetic result of the target pixel every clock, and the target pixel shifts to the right by one pixel every clock. Therefore, the pixels A and B wherein the subtraction was performed in the present clock become pixels A-1 and B-1 in the next clock. Then, the subtraction result V[AB] which was used in the present clock becomes the same as the value of V[(A-1)(B-1)] in the next clock. When another one clock elapses, this subtraction result V[(A-1)(B-1)] becomes the same value as V[(A-2) (B-2)]. By using such a characteristic, it is possible to reuse subtraction results which are stored as subtraction results of the same line by storing the subtraction result for six clocks.

The following expresses that one subtraction result can be reused as a subtraction result which is described on the immediate left thereof in the next clock or in the following clocks. According to this, one subtraction result can be reused as up to six subtraction results by storing the one subtraction result for six clocks. With a circuit configuration which performs such reusing of subtraction results, it is possible to reduce the number of subtraction which had to be performed 56 times to essentially 17 times.

V[0310]←V[0411]←V[0512]
V[1017]←V[1118]←V[1219]
V[1018]←V[1119]
V[1117]←V[1218]
V[1516]←V[1617]←V[1718]←V[1819]←V[1920]←V[2021]
V[1624]←V[1826]←V[1927]
V[1723]←V[1824]←V[2026]
V[1724]←V[1825]←V[1926]
V[2223]←V[2324]←V[2425]←V[2526]←V[2627]←V[2728]
V[2331]←V[2432]←V[2634]
V[2430]←V[2632]←V[2733]
V[2431]←V[2532]←V[2633]
V[2930]←V[3031]←V[3132]←V[3233]←V[3334]←V[3435]
V[3138]←V[3239]←V[3340]
V[3139]←V[3240]
V[3238]←V[3339]
V[3845]←V[3946]←V[4047]

The template determination unit 22 checks V[AB] which is output from the edge determination unit 21 against the templates and determines a matching template. The templates are designed so that edge patterns to be smoothed can be detected.

Figure 4:
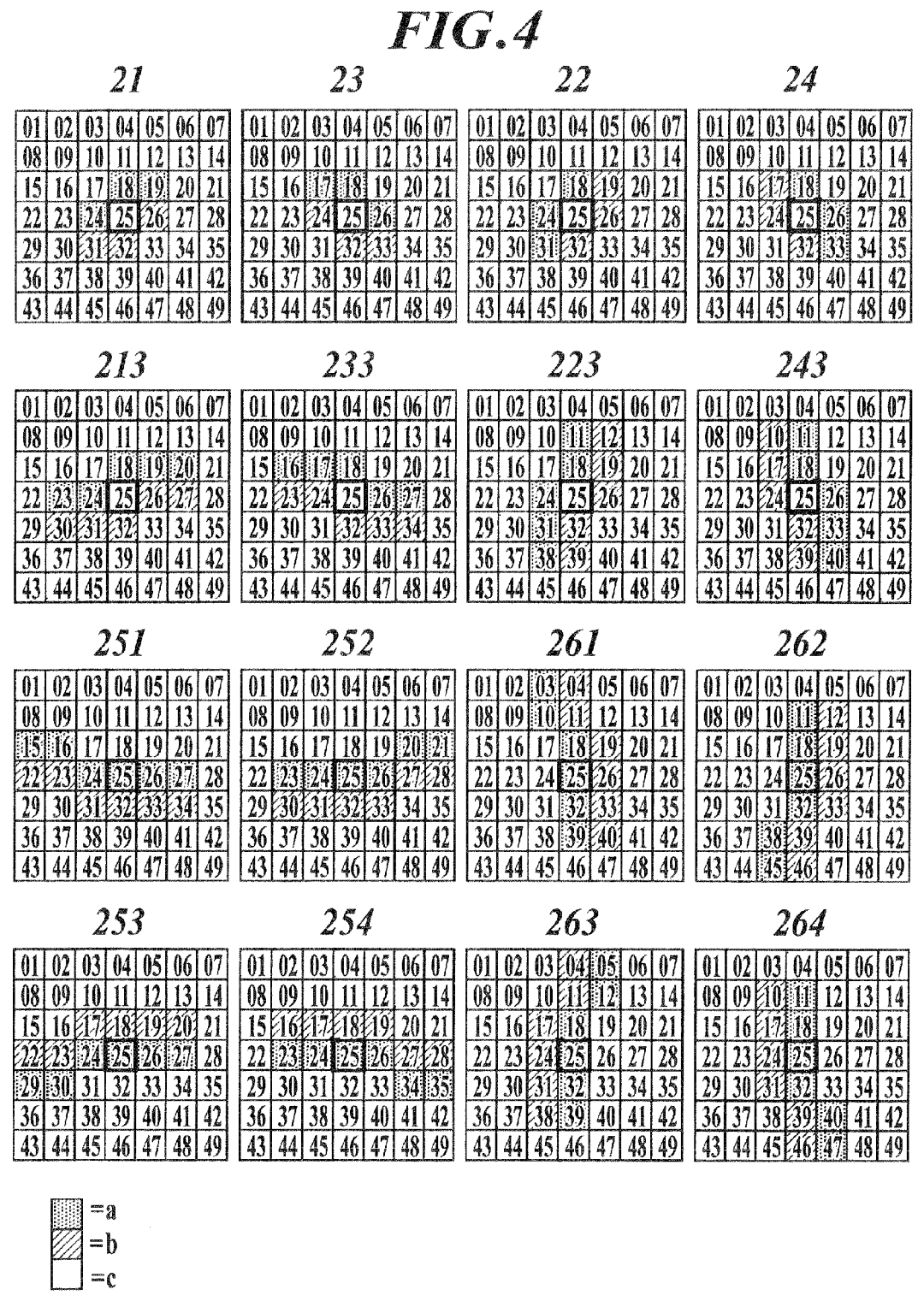

FIG. 4 shows an example of templates. In FIG. 4, the number above each template is an identification number which is appended to the template.

The pixels on the template are classified into three types which are a, b and c as shown in FIG. 4. The template determination unit 22 determines that a template is a match when V[AB]=0 between the pixels corresponding to the classification a, V[AB]=0 between the pixels corresponding to the classification b and V[AB]=1 between the pixels corresponding to the classification a and the pixels corresponding to the classification b on the template are fulfilled. Presence or absence of an edge does not matter in the pixel of classification c. In some cases, not only one template but a plurality of templates can be a match. The template determination unit 22 checks V[AB] against all the templates and detects all the matching templates.

For example, when all of V[1824]=0, V[2632]=0, V[1826]=1, V[1819]=0 and V[3132]=0 are met, the template determination unit 22 determines that the template of identification number 21 is a match. In addition, when all of V[2324]=0, V[3031]=0, V[1920]=0 and V[2627]=0 are met, the template determination unit 22 determines that not only the template of identification number 21, but also the template of identification number 213 is a match.

The template selection unit 23 selects one template from one or a plurality of matching templates obtained by checking against the templates by the template determination unit 22. A priority order is set for the templates shown in FIG. 4. The template selection unit 23 selects a template which has the highest priority from the matching templates according to the priority order. The priority order is set for the templates in the following descending order: identification number 24, 23, 22, 21, 233, 213, 243, 223, 252, 251, 254, 253, 262, 261, 264 and 263.

The pixel value calculation unit 24 uses pixel values of the pixels corresponding to the classifications a and b set on the template which was selected by the template selection unit 23 and calculates and outputs the change amount dSMT in pixel value of the target pixel due to smoothing processing of the target pixel.

Calculation formulae of dSMT are as follows. In the calculation formulae, C is a pixel value of each pixel indicated by the identification number inside the parenthesis. The pixel value of the target pixel is indicated by C[25].

When the identification number of the selected template is 21, 22, 23 or 24, $$dSMT=(C[18]+C[25]+C[32])/3-C[25]$$

When the identification number of the selected template is 213 or 233, $$dSMT=(C[18]\times 2+C[25]+C[32]\times 2)/5-C[25]$$

When the identification number of the selected template is 223 or 243, $$dSMT=(C[24]\times 2+C[25]+C[26]\times 2)/5-C[25]$$

When the identification number of the selected template is 251 or 252, $$dSMT=(C[25]\times 4+C[32])/5-C[25]$$

When the identification number of the selected template is 253 or 254, $$dSMT=(C[25]\times 4+C[18])/5-C[25]$$

When the identification number of the selected template is 261 or 262, $$dSMT=(C[25]\times 4+C[26])/5-C[25]$$

When the identification number of the selected template is 263 or 264, $$dSMT=(C[25]\times 4+C[24])/5-C[25]$$

By adding the obtained change amount dSMT to the pixel value of the target pixel, a pixel value of the target pixel after the smoothing processing is obtained. According to such smoothing processing, a target pixel corresponding to an edge to be smoothed can be detected by determining whether a difference in pixel value between adjacent two pixels is nearly the same value or a different value. Because the pixel value of the detected target pixel is converted to a weighted average value of pixel values of the target pixel and surrounding pixels thereof, smoothing processing can be performed for any pixel value of the foreground and the background including halftone.

The thinning processing unit 3 performs thinning processing on each pixel of image data.

Thinning processing is performed in units of 3×3 pixels. The thinning processing unit 3 inputs image data of three lines for three clocks from the line memory and obtains 3×3 pixels. Three thinning processing units 3 are provided. Image data of lines 2 to 4 is input to the upper thinning processing unit 3, image data of lines 3 to 5 is input to the middle thinning processing unit 3 and image data of lines 4 to 6 is input to the lower thinning processing unit 3. Each thinning processing unit 3 performs thinning processing on a pixel which is located at the center of the 3×3 pixels, and calculates and outputs the change amount dSMT in pixel value due to the thinning processing. That is, pixel values of 1×3 pixels are input to each thinning processing unit 3 every clock and the change amounts dSMT in pixel value of 1×3 pixels (pixels of identification numbers 18, and 32) are output.

Figure 5:
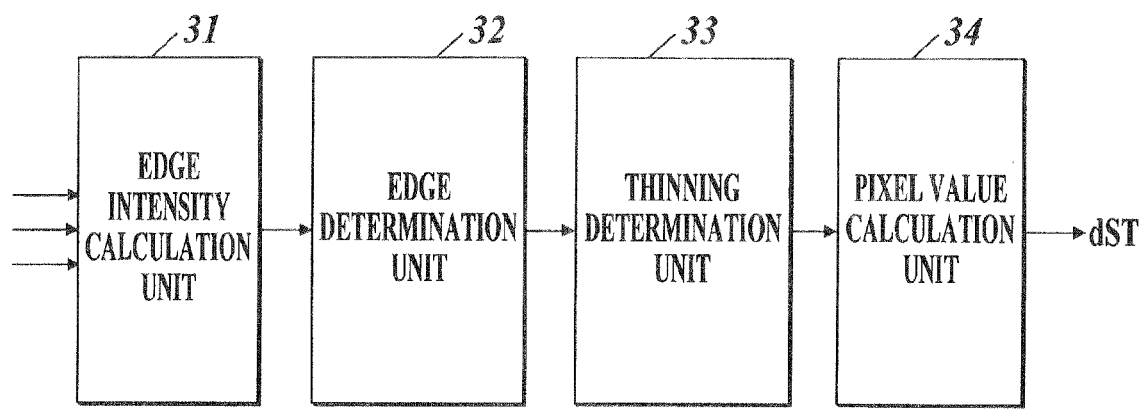
FIG. 5 is a configuration view of a thinning processing unit.

Each thinning processing unit 3 includes an edge intensity calculation unit 31, an edge determination unit 32, a thinning determination unit 33 and a pixel value calculation unit 34 as shown in FIG. 5.

Though each thinning processing unit 3 performs the processing on a pixel at different location, the processing is the same in content. Therefore, the thinning processing will be explained by taking the middle thinning processing unit 3 which performs processing on the target pixel of the identification number 25 as an example.

The edge intensity calculation unit 31 calculates the edge intensity in the target pixel. The edge intensity calculation unit 31 calculates differences EC) to E7 between the target pixel and the surrounding pixels thereof, and obtains the maximum value PED among them. The calculation formulae of E0 to E7 are as follows. C is a pixel value of each pixel which is indicated by the identification number inside the parenthesis.

$$E0=C[25]-C[17]$$

$$E1=C[25]-C[18]$$

$$E2=C[25]-C[19]$$

$$E3=C[25]-C[24]$$

$$E4=C[25]-C[26]$$

$$E5=C[25]-C[31]$$

$$E6=C[25]-C[32]$$

$$E7=C[25]-C[33]$$

The edge intensity calculation unit 31 inverts the signs of E0 to E7 and obtains the maximum value RED among them. The thinning processing unit 3 modifies to PED=0 if PED<RED, and modifies to RED=0 if RED<PED.

E0 to E7, PED and RED which are obtained as mentioned above are edge intensity.

The edge determination unit 32 obtains TPED and TRED by the following formulae using PED and RED which are obtained from image data of each color in a case of color image. The PED and RED shown with y, m, c and k inside the parenthesis indicate edge intensity which are obtained from image data of yellow, magenta, cyan and black color, respectively.

$$TPED=(PED[y]\times Wy+PED[m]\times Wm+PED[c]\times Wc+PED[k]\times Wk)$$

$$TRED=(RED[y]\times Wy+RED[m]\times Wm+RED[c]\times Wc+RED[k]\times Wk)$$

In the above formulae, Wy, Wm, Wc and Wk are predetermined coefficients and Wy+Wm+Wc+Wic≤255.

In a case of monochrome image, TPED=PED[k]×Wk and TRED=RED[k]×Wk.

TPED and TRED are values which are obtained by weighting the edge intensity PED and RED of each color with coefficients Wy, Wm, Wc and Wk equivalent to relative luminosity respectively and adding up the weighted values. TPED and TRED can be a visual index of density when each color is overlaid. Because the target of the thinning is an edge in the foreground, the edge determination unit 32 determines which of the target pixel and the surrounding pixels is the foreground or the background by determining magnitude relationship of TPED and TRED. If TPED>TRED, the edge determination unit 32 determines that the target pixel is an edge in the foreground which has a greater density than the background, and outputs ED=1. On the other hand, if TPED≤TRED, the edge determination unit 32 determines that the target pixel is not an edge in the foreground, and outputs ED=0.

The thinning determination unit 33 determines whether the target pixel which is determined to be an edge in the foreground can be a target of thinning. In a case wherein a target pixel which is an edge does not have a sufficient pixel value for thinning, that is, to be reduced, the target pixel need to be excluded from the target of the thinning, because the pixel value will be very small or vanished causing breaks in the image by reducing the pixel value. The thinning determination unit 33 compares the pixel value C[25] of the target pixel in each color to threshold value Th2. If the pixel value C[25] in any color is equal to or greater than the threshold value Th2, the thinning determination unit 33 determines that the pixel has a sufficient pixel value for the thinning, and outputs SS=1. On the other hand, if the pixel value C[25] of the target pixel in every color is smaller than the threshold value Th2, the thinning determination unit 33 determines that the target pixel is not a target of thinning because the pixel does not have a sufficient pixel value for the thinning, and outputs SS=0.

The pixel value calculation unit 34 calculates and outputs the change amount dST in pixel value of the target pixel due to thinning processing.

When ED=1 and SS=1, the target pixel is an edge and has a sufficient pixel value for thinning. Thus, the pixel value calculation unit 34 performs thinning on the target pixel and calculates the change amount dST in pixel value by the following formula. The change amount dST is obtained for each color by using PED and RED which are obtained for each color.

$$dST=(PED-RED)\times STVL$$

The above STVL is a coefficient to adjust intensity of the thinning, and is previously determined for each color. STVL can have a value range of 0 to 1.

By adding the obtained change amount dST to the original pixel value, the pixel value after thinning is obtained. As shown in the calculation formula of dST, thinning processing not only includes a case wherein dST is a negative value and the pixel value of the target pixel is decreased to literally thin the target pixel, but also includes a case wherein dST is a positive value and the pixel value of the target pixel is increased to thicken the target pixel.

If ED=1 and SS=1 is not met, the target pixel is not an edge, or is an edge which does not have a sufficient pixel value for thinning. Thus, the pixel vale calculation unit 34 does not perform thinning of the target pixel, and outputs the change amount dST=0 in pixel value.

The edge direction determination unit 4 determines an edge direction in each pixel of the image data.

The edge direction is determined in units of 5×5 pixels. The edge direction determination unit 4 inputs image data of lines 2 to 6 for five clocks from the line memory and obtains 5×5 pixels with the target pixel of the blending processing unit 5 located at the center thereof. The edge direction determination unit 4 determines and outputs the edge direction pos in the target pixel which is located at the center of the input 5×5 pixels. That is, pixel values of 1×5 pixels are input to the edge direction determination unit 4 and the edge direction pos for one pixel is output every clock. The edge direction is a direction from a pixel with a small pixel value to a pixel with a large pixel value. When the target pixel is an edge in the foreground or the background, the direction from the background to the foreground is determined as the edge direction.

The edge direction determination unit 4 calculates SP which is a difference between the target pixel (pixel of identification number 25) and each of the eight surrounding pixels (pixels of identification numbers 17, 18, 19, 24, 26, 31, 32 and 33) which are adjacent to the target pixel, and SF which is a difference between the target pixel (pixel of identification number 25) and each of the surrounding pixels (pixels of identification numbers 11, 23, 27 and 39) which are two pixels away from the target pixel in upper, lower, left and right directions.

The calculation formulae are as follows. C is a pixel value of each pixel indicated by the identification number inside the parenthesis.

$$SP[u]=C[25]-C[18]$$

$$SP[l]=C[25]-C[24]$$

$$SP[r]=C[25]-C[26]$$

$$SP[d]=C[25]-C[32]$$

$$SF[u]=C[25]-C[11]$$

$$SF[l]=C[25]-C[23]$$

$$SF[r]=C[25]-C[27]$$

$$SF[d]=C[25]-C[39]$$

The edge direction determination unit 4 respectively determines edge direction x in the main scanning direction and edge direction y in the sub scanning direction of the target pixel. The x and y can have a value of 0 or ±1. "0" indicates that there is no edge and "1" indicates that there is an edge. Plus and minus signs correspond to the directions.

Figure 6:
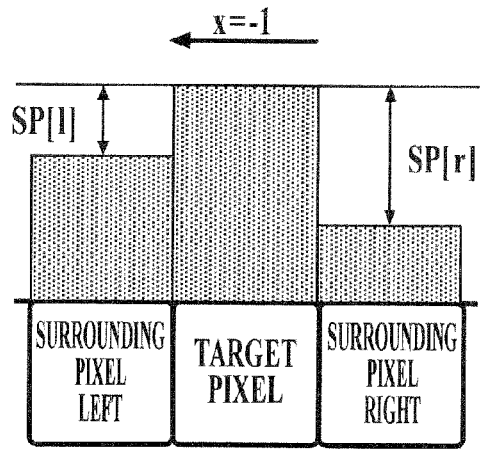
FIG. 6 is a determination example of an edge direction.
Figure 7:
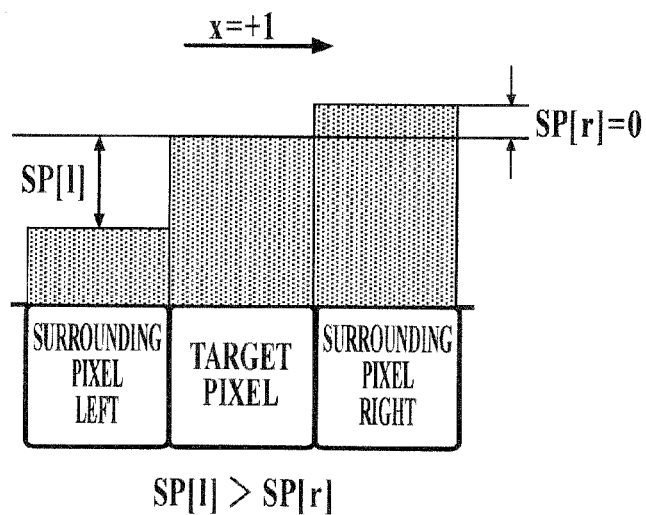
FIG. 7 is a determination example of an edge direction.

For example, if SP[l]<SP[r], the pixel value of the right surrounding pixel is smaller between the pixels on left and right of the target pixel as shown in FIG. 6. Thus, the edge direction determination unit 4 determines the edge direction in the main scanning direction to be left and outputs x=−1. On the other hand, if SP[l]>SP[r], the pixel value of the left surrounding pixel is smaller between the pixels on left and right of the target pixel as shown in FIG. 7. Thus, the edge direction determination unit 4 determines the edge direction in the main scanning direction to be right and outputs x=+1.

Similarly, the edge direction in the sub scanning direction is determined by comparing SP[u] and SP[d]. If SP[u]>SP[d], the edge direction determination unit 4 determines the edge direction in the sub scanning direction to be down, and outputs y=−1. If SP[u]<SP[d], the edge direction determination unit 4 determines the edge direction in the sub scanning direction to be up, and outputs y=+1.

In a case of SP[l]=SP[r], there is no difference in pixel value between left and right pixels of the target pixel. Similarly, in a case of SP[u]=SP[d], there is no difference in pixel value between the pixels above and below the target pixel. In such cases, the edge direction determination unit 4 determines that there is no edge on the left and right or above and below of the target pixel, and outputs x=0 or y=0, respectively.

When the target pixel is not an edge but an inner edge which is one pixel inside than the edge, the edge direction determination unit 4 determines the edge direction as well.

When the target pixel is an inner edge, the edge direction is x=y=0. Thus, when the edge direction is x=y=0, the edge direction determination unit 4 modifies edge directions x and y by SF[l], SF[r], SF[u] and SF[d] which are obtained from the surrounding pixels located two pixels away from the target pixel.

The edge direction determination unit 4 modifies x=0 to x=−1 if SF[l]<SF[r], and modifies x=0 to x=+1 if SF[l]>SF[r]. Similarly, the edge direction determination unit 4 modifies y=0 to y=−1 if SF[u]>SF[d], and modifies y=0 to y=+1 if SF[u]<SF[d]. If SF[l]=SF[r], the edge direction determination unit 4 does not perform modification and outputs x=0 as it is. In a case of SF[u]=SF[d], the edge direction determination unit 4 does not perform modification as well and outputs y=0 as it is.

Figure 8:
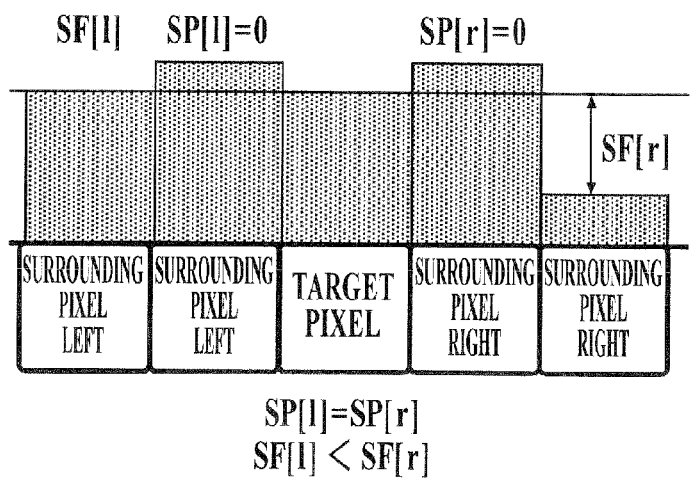
FIG. 8 is a determination example of an edge direction.

For example, if the surrounding pixel on the right which is two pixels away from the target pixel is an edge and the target pixel is an inner edge as shown in FIG. 8, the edge direction determination unit 4 determines that x=0 because SP[l]=SP[r]. However, x=0 is modified to be x=−1 because SF[l]<SF[r].

The edge direction determination unit 4 determines and outputs the overall edge direction pos by the combination of edge direction x in the main scanning direction and edge direction y in the sub scanning direction. Pos can have a value of 0 to 4. 0 indicates center (no edge), 1 indicates leftward direction, 2 indicates rightward direction, 3 indicates upward direction and 4 indicates downward direction. Edge directions pos corresponding to combinations of x and y are as follows.

When x=1 and y=−1, pos=4
When x=1 and y=0, pos=2
When x=1 and y=+1, pos=2
When x=0 and y=−1, pos=4
When x=0 and y=0, pos=0
When x=0 and y=+1, pos=3
When x=−1 and y=−1, pos=1
When x=−1 and y=0, pos=1
When x=−1 and y=+1, pos=3

The blending processing unit 5 decides the pixel value of each pixel when thinning processing and smoothing processing are realized at the same time.

The blending processing unit 5 inputs image data of lines 2 to 6 of the line memory for five clocks and obtains 5×5 pixels having the target pixel of identification number 25 located at the center thereof. Also, the blending processing unit 5 shifts the processing results (change amounts dSMT and dST) of 1×3 pixels which are output from the smoothing processing unit 2 and the thinning processing unit 3 by three pixels in the main scanning direction, and inputs processing results for 3×3 pixels having the target pixel of identification number 25 located at the center thereof. The blending processing unit 5 also inputs the edge direction pos of the target pixel from the edge direction determination unit 4. The blending processing unit 5 decides the pixel value G of when both thinning and smoothing are realized at the same time in the target pixel depending on the combination of whether thinning is performed or not and whether smoothing is performed or not on the target pixel. To decide the pixel value G, each pixel value C of the target pixel, surrounding pixels adjacent to the target pixel in the upper, lower, left and right directions and surrounding pixels which are two pixels away from the target pixel in the upper, lower, left and right directions of the target pixel, the change amounts dST and dSMT in pixel value of the target pixel and in pixel values of the surrounding pixels adjacent to the target pixel in the upper, lower, left and right directions, and the edge direction pos on the target pixel are used.

Figure 9:
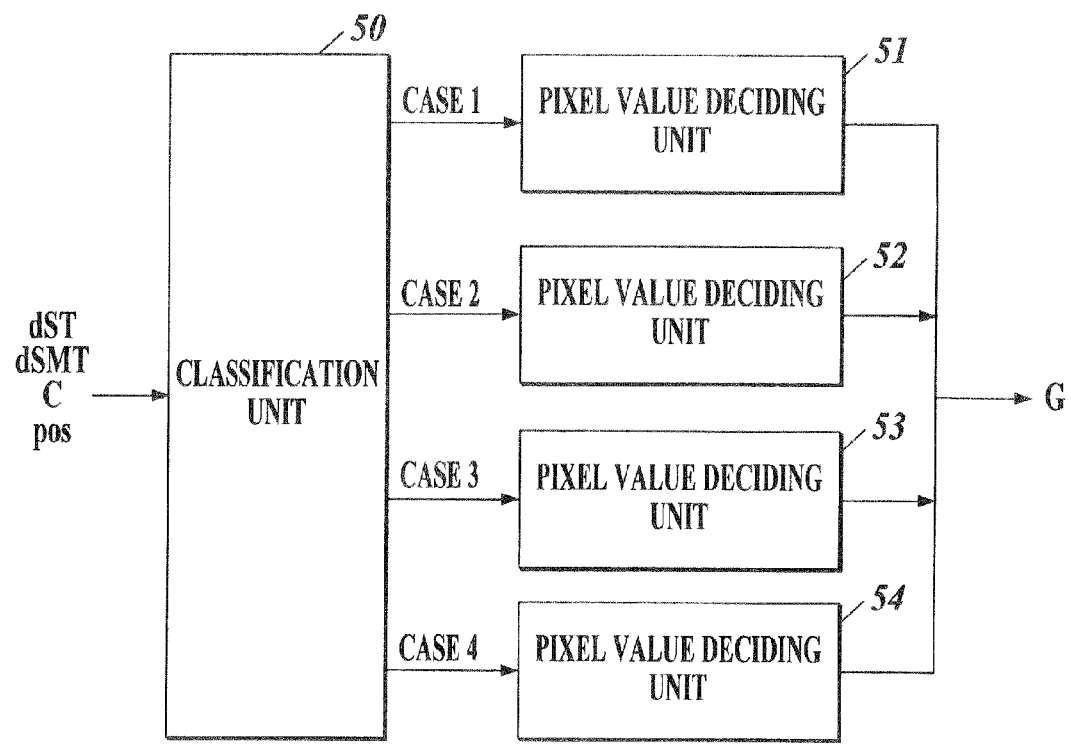
FIG. 9 is a configuration view of a blending processing unit.

The blending processing unit 5 includes a classification unit 50 and pixel value deciding units 51 to 54 as shown in FIG. 9.

The classification unit 50 classifies the state of thinning and smoothing in the target pixel into cases 1 to 4 depending on the combination of whether thinning is performed or not and whether smoothing is performed or not on the target pixel. Whether the thinning is performed or not and whether the smoothing is performed or not can be determined by whether the values of the change amounts dST and dSMT are zero. The classification unit 50 determines that thinning is performed on the target pixel as a result of thinning processing if the change amount dST[25] which is input from the thinning processing unit 3 with regard to the target pixel meets dST[25]≠0, and determines that thinning is not performed if the change amount dST[25] meets dST[25]=0. Similarly, the classification unit 50 determines that smoothing is performed if the change amount dSMT[25] which is input from the smoothing processing unit 2 with regard to the target pixel meets dSMT[25]≠0, and determines that smoothing is not performed if the change amount dSMT[25] meets dSMT[25]=0.

Figure 10:
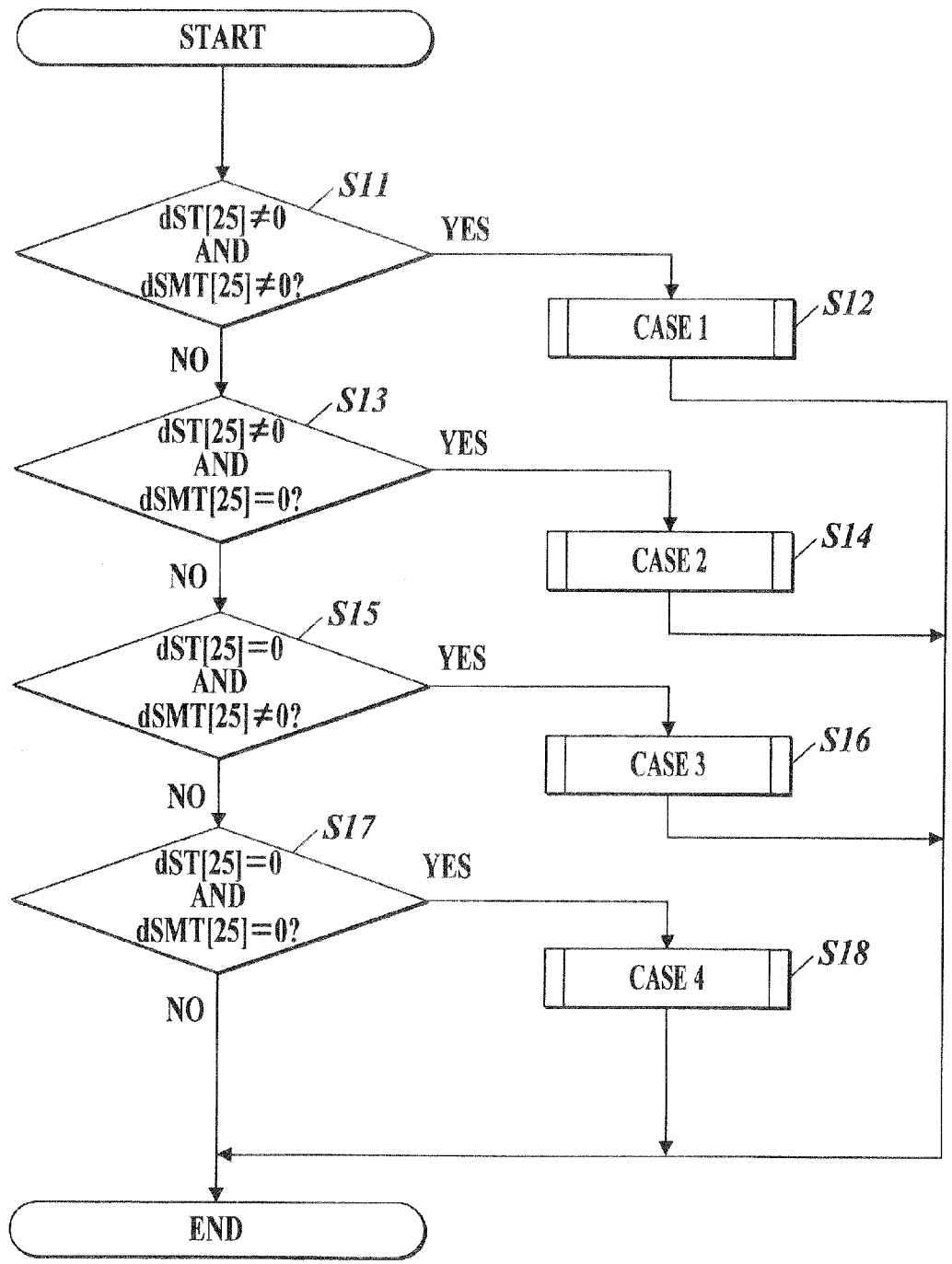
FIG. 10 is a flowchart of processing performed by a classification unit.

FIG. 10 is a flowchart showing a flow of processing performed by the classification unit 50.

As shown in FIG. 10, when the change amounts of the target pixel meet dST[25]≠0 and dSMT[25]≠0(step S11; Y), the classification unit 50 classifies the case into case 1 (step S12). When the change amounts of the target pixel meet dST[25]≠0 and dSMT[25]=0 (step S11; N, S13; Y), the classification unit 50 classifies the case into case 2 (step S14). When the change amounts of the target pixel meet dST[25]=0 and dSMT[25]≠0(step S13; N, S15; Y), the classification unit 50 classifies the case into case 3 (step S16). When the change amounts of the target pixel meet dST[25]=0 and dSMT[25]=0 (step S15; N, S17; Y), the classification unit 50 classifies the case into case 4 (step S18).

The classification unit 50 outputs the change amounts dST and dSMT, pixel value C and edge direction pos to the pixel value deciding unit 51 in case 1, to the pixel value deciding unit 52 in case 2, to the pixel value deciding unit 53 in case 3 and to the pixel value deciding unit 54 in case 4.

The pixel value deciding units 51 to 54 determine the pixel value G[25] of the target pixel of when both thinning processing and smoothing processing are realized at the same time depending on the cases 1 to 4, respectively.

<Case 1>

Figure 11:
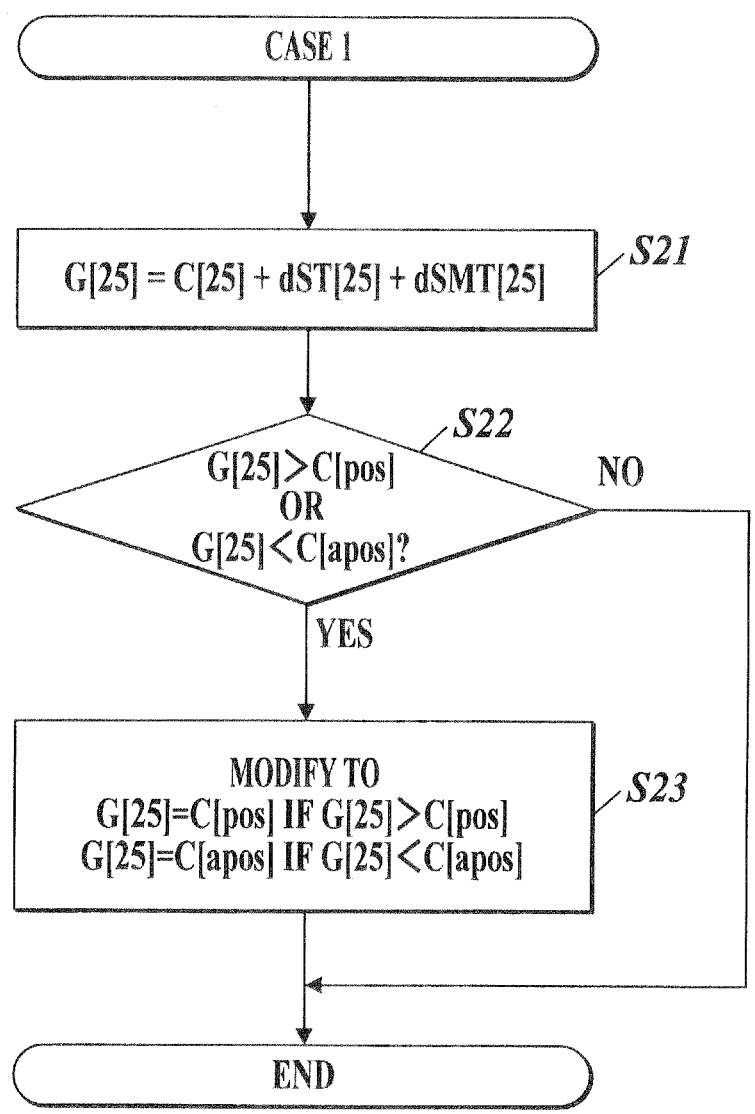
FIG. 11 is a flowchart of processing performed by a pixel value deciding unit in case 1.

FIG. 11 is a flowchart of processing which is executed by the pixel value deciding unit 51 in case 1.

Figure 12A:
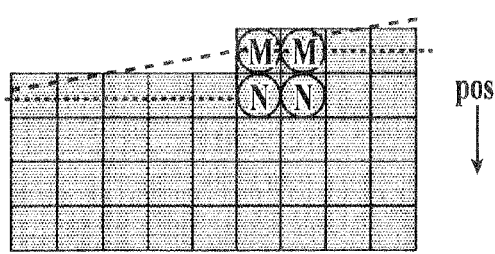
FIGS. 12A and 12B are diagrams illustrating an assumed positional relationship between a target pixel and a surrounding pixel thereof in case 1.
Figure 12B:
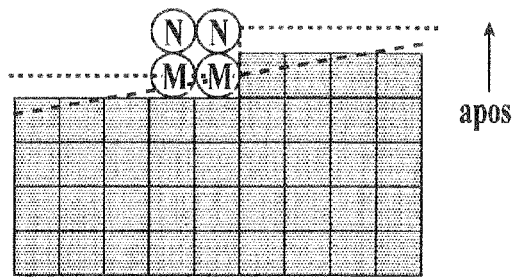

In case 1, both thinning and smoothing are performed on the target pixel, and thus the target pixel is assumed to be an edge in foreground as shown in FIG. 12A or an edge in background as shown in FIG. 12B. If the target pixel is an edge in foreground, both of the change amounts dST and dSMT of the target pixel M are negative values as shown in FIG. 12A, and thus the pixel value is decreased by the thinning processing and the smoothing processing. If the target pixel is an edge in background, both of the change amounts dST and dSMT of the target pixel M are positive values as shown in FIG. 12B, and thus the pixel value is increased by the thinning processing and the smoothing processing.

In both cases, the target pixel M is thinned and smoothed, and the surrounding pixel N adjacent to the target pixel M in the edge direction pos or in the opposite-edge direction apos which is an opposite direction of the edge direction is not thinned nor smoothed. Therefore, the pixel value deciding unit 51 decides and outputs the value which is obtained by adding the change amounts dST[25] and dSMT[25] to the original pixel value C[25] of the target pixel as the pixel value G[25] of the target pixel when thinning processing and smoothing processing are realized at the same time as shown in FIG. 11 (step S21).

It does not appear natural if the decided pixel value G[25] of the target pixel does not range between the pixel value of the foreground and the pixel value of the background because the density of the target pixel stands out at the border of the foreground and the background. Therefore, if the pixel value G[25] of the target pixel is larger than the pixel value C[pos] of the foreground, that is, the surrounding pixel adjacent to the target pixel in the edge direction (step S22; Y), the pixel value deciding unit 51 modifies the decided pixel value G[25] of the target pixel to the pixel value of the foreground C[pos] (step S23). If the pixel value G[25] of the target pixel is smaller than the pixel value C[apos] of the background, that is, the surrounding pixel adjacent to the target pixel in the opposite-edge direction of the target pixel (step S22; Y), the pixel value deciding unit 51 modifies the decided pixel value G[25] of the target pixel to the pixel value C[apos] of the background (step S23). Apos is set to have a value of direction which is opposite of the edge direction pos. That is, apos=2 is set if pos=1, and apos=4 is set if pos=3. If there is no edge direction, pos=apos=0.

<Case 2>

Figure 13:
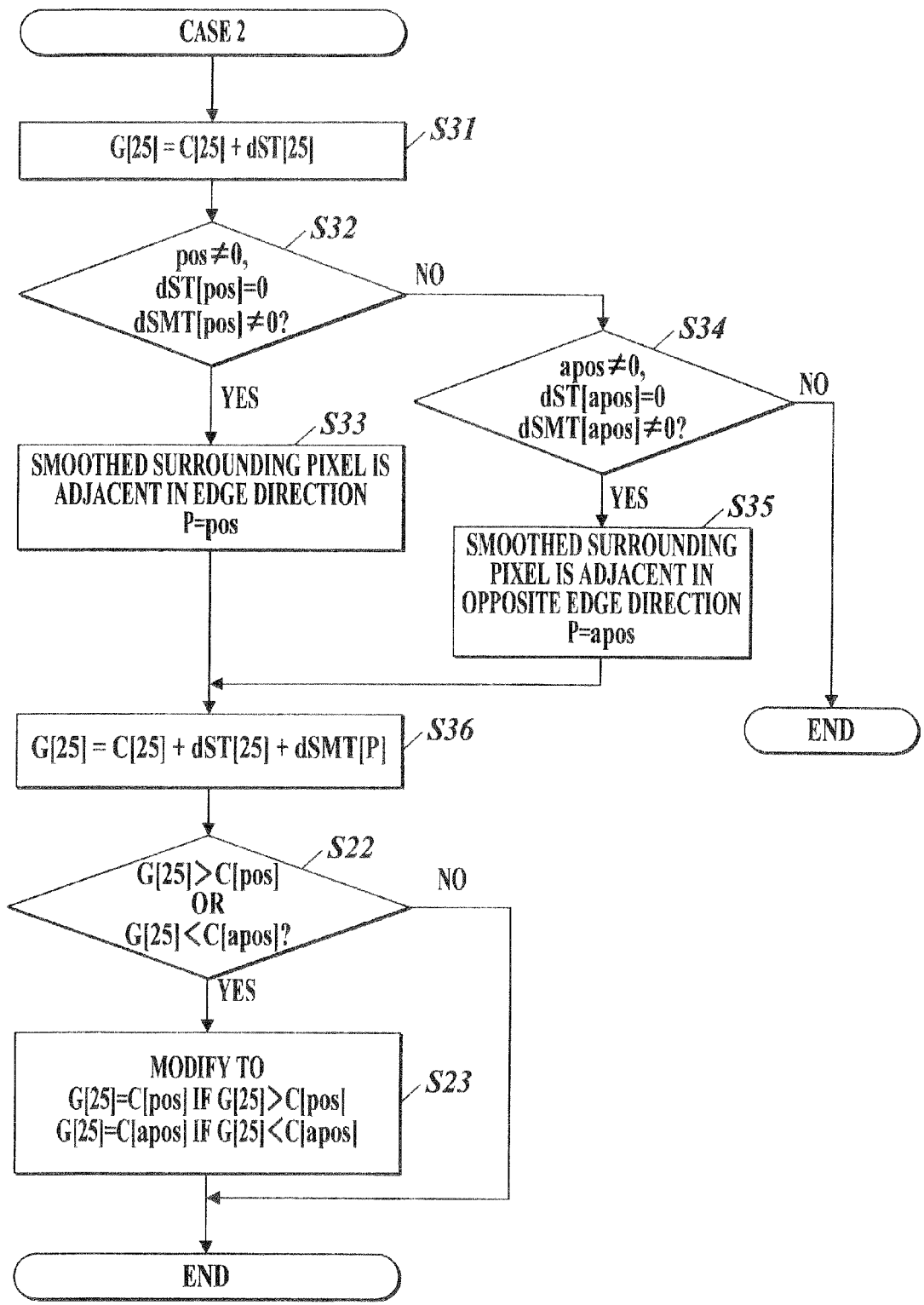
FIG. 13 is a flowchart of processing performed by the pixel value deciding unit in case 2.

FIG. 13 is a flowchart of processing which is executed by the pixel value deciding unit 52 in case 2.

Figure 14A:
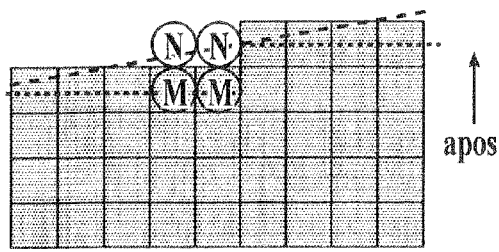
FIGS. 14A and 14B are diagrams illustrating an assumed positional relationship between a target pixel and a surrounding pixel thereof in case 2.
Figure 14B:
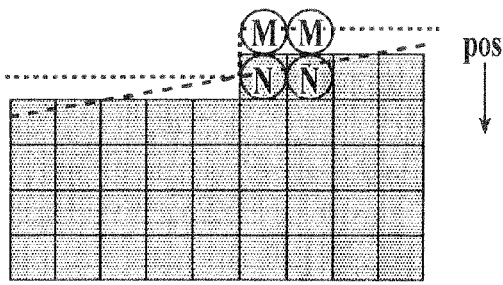

In case 2, only the thinning is performed on the target pixel, and thus the target pixel is assumed to be an edge in foreground as shown in FIG. 14A or an edge in background as shown in FIG. 14B. If the target pixel is an edge in foreground, the change amount dST of the target pixel M is a negative value as shown in FIG. 14A, and the pixel value is decreased due to thinning processing. The change amount dSMT of the surrounding pixel N adjacent to the target pixel M in the opposite-edge direction apos is a positive value, and the pixel value is increased due to smoothing processing. If the target pixel is an edge in background, the change amount dST of the target pixel M is a positive value as shown in FIG. 14B, and the pixel value is increased due to thinning processing. The change amount dSMT of the surrounding pixel N adjacent to the target pixel M in the edge direction pos is a negative value, and the pixel value is decreased due to smoothing processing.

In such way, when the surrounding pixel which is not thinned but is smoothed is adjacent to the target pixel in the edge direction pos or in the opposite-edge direction apos, the target pixel being thinned, the pixel value deciding unit 52 decides the pixel value of the surrounding pixel as well as the target pixel of when thinning processing and smoothing processing are realized at the same time.

Because only the thinning is performed on the target pixel, the pixel value deciding unit 52 temporarily decides the value obtained by adding the change amount dST[25] in pixel value of the target pixel due to thinning processing to the original pixel value C[25] of the target pixel as the pixel value G[25] of the target pixel of when thinning processing and smoothing processing are realized at the same time as shown in FIG. 13 (step S31). Subsequently, the pixel value deciding unit 52 determines in which of the edge direction pos and the opposite-edge direction apos the smoothed surrounding pixel is adjacent to the target pixel.

If the edge direction pos, the change amounts dST[pos] and dSMT[pos] which are input with regard to the surrounding pixel adjacent to the target pixel in the edge direction pos meet pos≠0, dST[pos]=0 and dSMT[pos]≠0 (step S32; Y), the pixel value deciding unit 52 determines that the smoothed surrounding pixel is adjacent to the target pixel in the edge direction pos (step S33).

If the opposite-edge direction apos, the change amounts dST[apos] and dSMT[apos] which are input with regard to the surrounding pixel adjacent to the target pixel in the opposite-edge direction apos meet apos≠0, dST[apos]=0 and dSMT[apos]≠0 (step S32; N, S34; Y), the pixel value deciding unit 52 determines that the smoothed surrounding pixel is adjacent in the background, that is, adjacent to the target pixel in the opposite-edge direction apos (step S35).

If none of the conditions is met (step S34; N), the pixel value deciding unit 52 determines that the smoothed surrounding pixel is not adjacent to the target pixel in the edge direction pos nor in the opposite-edge direction apos, and outputs the pixel value G[25] of the target pixel which was decided in step S31.

When the direction in which the smoothed surrounding pixel is adjacent to the target pixel is specified, the pixel value deciding unit 52 decides the value which is obtained by adding the change amount dST[25] in pixel value of the target pixel due to thinning processing and the change amount dSMT[P] in pixel value of the surrounding pixel due to smoothing processing to the original pixel value C[25] of the target pixel as the pixel value G[25] of the target pixel (step S36). Pos or apos is input for P. If the smoothed surrounding pixel is adjacent to the target pixel in the edge direction pos, dSMT[pos] is used for dSMT[P]. If the smoothed surrounding pixel is adjacent to the target pixel in the opposite-edge direction apos, dSMT[apos] is used for dSMT[P].

Thereafter, the processing in case 2 is same as in case 1 in the respect that the pixel value G[25] of the target pixel is modified by pixel values of the foreground and the background. Therefore, same step numbers are used for the steps in FIG. 13 which are same as those in FIG. 11 and the explanation thereof is omitted.

<Case 3>

FIG. 15 is a flowchart of processing which is executed by the pixel value deciding unit 53 in case 3.

Figure 16A:
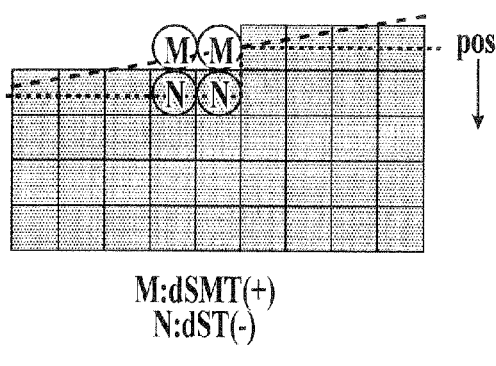
FIGS. 16A and 16B are diagrams illustrating an assumed positional relationship between a target pixel and a surrounding pixel thereof in case 3.
Figure 16B:
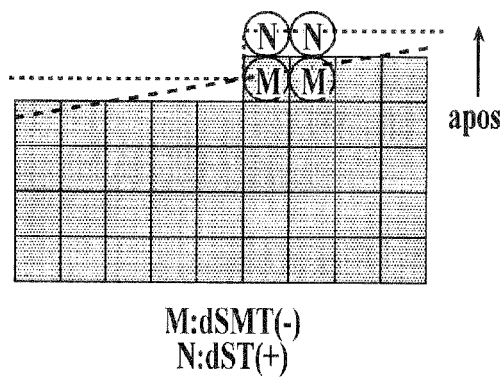

In case 3, only the smoothing is performed on the target pixel, and thus the target pixel is assumed to be an edge in background as shown in FIG. 16A or an edge in foreground as shown in FIG. 16B. If the target pixel is an edge in background, the change amount dSMT of the target pixel M is a positive value as shown in FIG. 16A and the pixel value is increased due to the smoothing processing. The change amount dST of the surrounding pixel N adjacent to the target pixel M in the edge direction pos is a negative value, and the pixel value is decreased due to the thinning processing. If the target pixel is an edge in foreground, the change amount dSMT of the target pixel M is a negative value as shown in FIG. 16B and the pixel value is decreased due to the smoothing processing. The change amount dST of the surrounding pixel N adjacent to the target pixel M in the opposite-edge direction apos is a positive value, and the pixel value is increased due to the thinning processing.

In such way, when the thinned surrounding pixel is adjacent to the target pixel in the edge direction pos or in the opposite-edge direction apos, the target pixel being smoothed, the pixel value deciding unit 53 decides the pixel value G[P] of the surrounding pixel as well as the target pixel of when thinning processing and smoothing processing are realized at the same time.

Because only the smoothing is performed on the target pixel, the pixel value deciding unit 53 temporarily decides the value obtained by adding the change amount dSMT[25] of the target pixel due to smoothing processing to the original pixel value C[25] of the target pixel as the pixel value G[25] of the target pixel of when thinning processing and smoothing processing are realized at the same time as shown in FIG. 15 (step S41). Subsequently, the pixel value deciding unit 53 determines in which direction of the edge direction pos or the opposite-edge direction apos the thinned surrounding pixel is adjacent to the target pixel.

If the edge direction pos, the change amounts dST[pos] and dSMT[pos] which are input with regard to the surrounding pixel adjacent to the target pixel in the edge direction pos meet pos≠0, dST[pos]≠0 and dSMT[pos]=0 (step S42; Y), the pixel value deciding unit 53 determines that the thinned surrounding pixel is adjacent to the target pixel in the edge direction pos (step S43).

If the opposite-edge direction apos, the change amounts dST[apos] and dSMT[apos] which are input on the surrounding pixel adjacent to the target pixel in the opposite-edge direction apos meet apos≠0, dST[apos]≠0 and dSMT[apos]=0 (step S42; N, S44; Y), the pixel value deciding unit 53 determines that the thinned surrounding pixel is adjacent to the target pixel in the opposite-edge direction apos (step S45).

If none of the conditions is met (step S44; N), the pixel value deciding unit 53 determines that the thinned surrounding pixel is not adjacent to the target pixel in the edge direction pos nor in the opposite-edge direction apos, and outputs the pixel value G[25] of the target pixel which was decided in step S41.

When the direction in which the thinned surrounding pixel is adjacent is specified, the pixel value deciding unit 53 inputs the larger value for L and the smaller value for S among the pixel value C[25] of the target pixel and the pixel value C[P] of the thinned surrounding pixel (step S46), and calculates temp by the following formula (step S47).

$$temp = L + S + dST[P] + dSMT[25]$$

For P, pos or apos is input. If the thinned surrounding pixel is adjacent to the target pixel in the edge direction pos, C[P] and dST[P] are C[pos] and dST[pos], respectively. If the thinned surrounding pixel is adjacent to the target pixel in the opposite-edge direction, C[P] and dST[P] are C[apos] and dST[apos], respectively.

Temp is the sum which is obtained by adding up the pixel value of the smoothed target pixel and the pixel value of the thinned surrounding pixel. The pixel value deciding unit 53 distributes the temp to the target pixel and the surrounding pixel.

If the total of the change amount dSMT[25] in pixel value of the target pixel due to smoothing processing and the change amount dST[P] in pixel value of the surrounding pixel due to thinning processing is a positive value, temp which is the sum of the pixel values of these two pixels becomes larger than L+S which is total of the original pixel values due to smoothing of the target pixel and thinning of the surrounding pixel. In this case, the pixel value deciding unit 53 distributes the pixel value L to the pixel which has the larger original pixel value, and distributes the rest of the pixel value temp-L to the other pixel value. When the sum temp is larger than twice the value of L, both the target pixel and the surrounding pixel have pixel values which are equal to or larger than L, and do not fit in the foreground nor the background naturally. In this case, the pixel value deciding unit 53 distributes the largest acceptable value of L to both pixels.

As shown in FIG. 15, when temp>L+S is fulfilled (step S48; Y) and temp<L×2 is fulfilled (step S49; Y), the pixel value deciding unit 53 decides the pixel value G[25] of the target pixel=L and the pixel value G[P] of the surrounding pixel=temp-L if the original pixel value C[25] of the target pixel is larger than the original pixel value C[P] of the surrounding pixel. Further, the pixel value deciding unit 53 decides the pixel value G[25] of the target pixel=temp−L and the pixel value G[P] of the surrounding pixel=L if the original pixel value C[25] of the target pixel is smaller than the original pixel value C[P] of the surrounding pixel, (step S50).

When temp>L+S is fulfilled (step S48; Y) and temp<L×2 is not fulfilled (step S49; N), the pixel value deciding unit 53 decides the pixel value G[25] of the target pixel=L and the pixel value G[P] of the surrounding pixel=L (step S51).

On the other hand, if the total of the change amount dSMT[25] in pixel value of the target pixel due to smoothing processing and the change amount dST[P] in pixel value of the surrounding pixel due to thinning processing is a negative value, temp which is the sum of the pixel values of these two pixels becomes smaller than L+S which is the total of the original pixel values due to smoothing of the target pixel and thinning of the surrounding pixel. In this case, the pixel value deciding unit 53 distributes the pixel value S to the pixel which has the smaller original pixel value, and distributes the rest of the pixel value temp−S to the other pixel value. When the sum temp is smaller than twice the value of S, both the target pixel and the surrounding pixel have pixel values which are equal to or smaller than S, and do not fit in the foreground nor the background naturally. In this case, the pixel value deciding unit 53 distributes the largest acceptable value of S to both pixels.

As shown in FIG. 15, when temp>L+S is not fulfilled (step S48; N) and temp>S×2 is fulfilled (step S52; Y), if the original pixel value C[25] of the target pixel is larger than the original pixel value C[P] of the surrounding pixel, the pixel value deciding unit 53 decides the pixel value G[25] of the target pixel=temp−S and the pixel value G[P] of the surrounding pixel=S. If the original pixel value C[25] of the target pixel is smaller than the original pixel value C[P] of the surrounding pixel, the pixel value deciding unit 53 decides the pixel value G[25] of the target pixel=S and the pixel value G[P] of the surrounding pixel=temp−S (step S53).

When temp>L+S is not fulfilled (step S48; N) and temp>S×2 is not fulfilled, either (step S52; N), the pixel value deciding unit 53 determines the pixel value G[25] of the target pixel=S and the pixel value G[P] of the surrounding pixel=S (step S54).

<Case 4>

Figure 17:
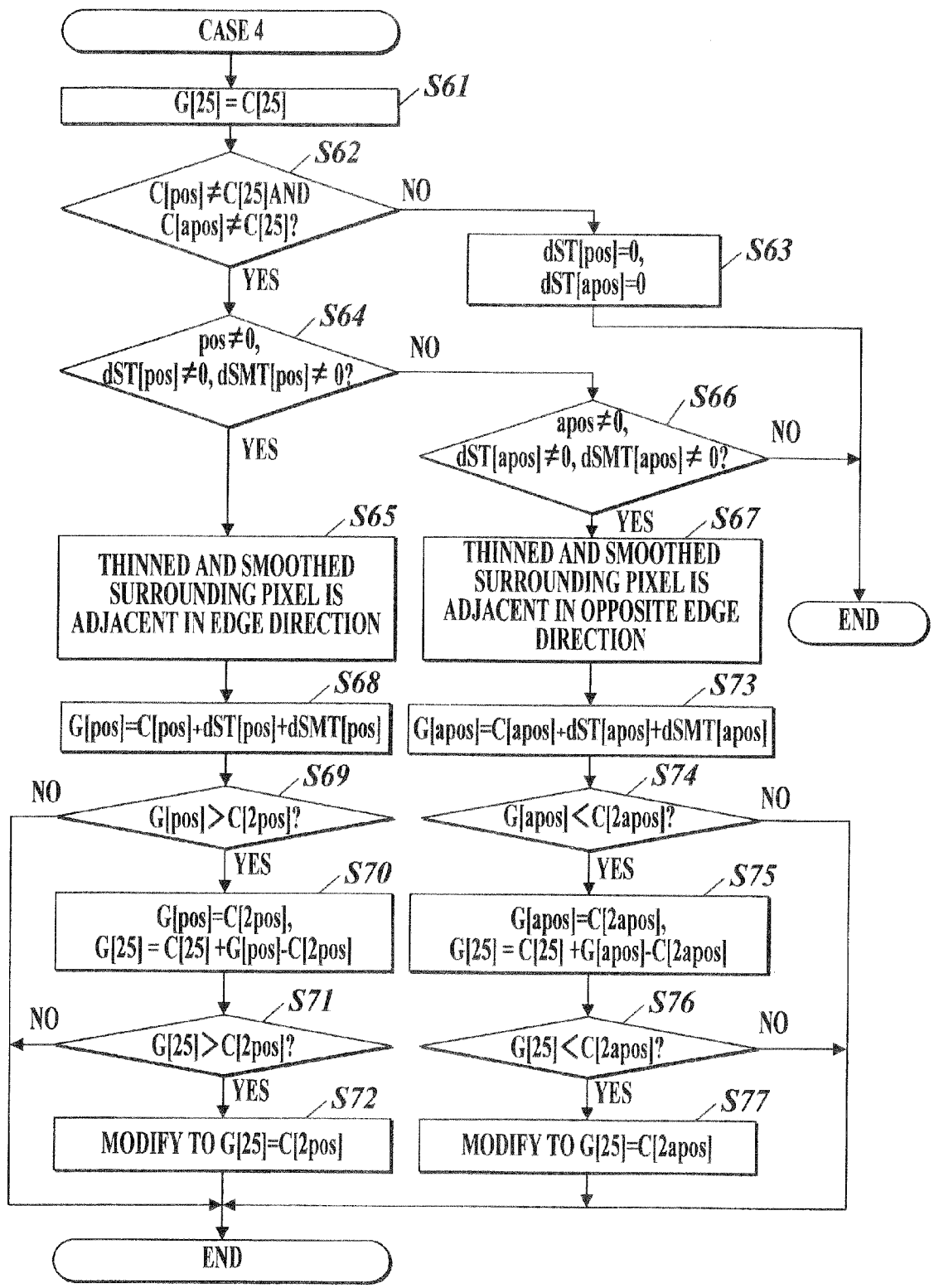
FIG. 17 is a flowchart of processing performed by the pixel value deciding unit in case 4.

FIG. 17 is a flowchart of processing which is executed by the pixel value deciding unit 54 in case 4.

Figure 18A:
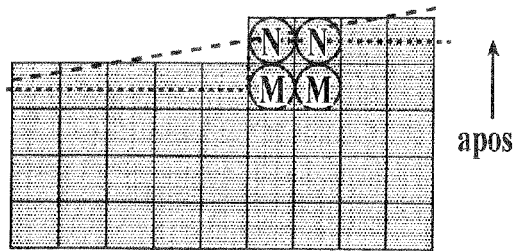
FIGS. 18A and 18B are diagrams showing an assumed positional relationship between a target pixel and a surrounding pixel thereof in case 4.
Figure 18B:
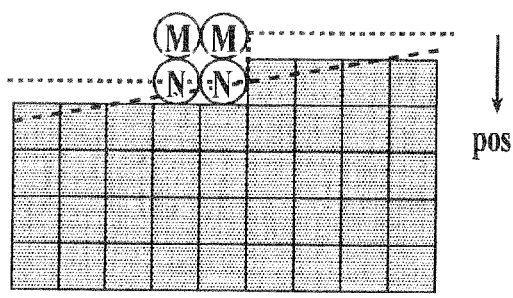

In case 4, neither thinning nor smoothing is performed on the target pixel, and thus the target pixel is assumed to be an inner edge in foreground as shown in FIG. 18A or an inner edge in background as shown in FIG. 18B. If the target pixel is an inner edge in foreground, neither thinning nor smoothing is performed on the target pixel Mas shown in FIG. 18A. However, the change amounts dST and dSMT of the surrounding pixel N adjacent to the target pixel M in the opposite-edge direction apos are both negative values, and thus the pixel value is decreased due to thinning processing and smoothing processing. If the target pixel is an inner edge in background, neither thinning nor smoothing is performed on the target pixel M as shown in FIG. 18B. However, the change amounts dST and dSMT of the surrounding pixel N adjacent to the target pixel M in the edge direction are both positive values, and thus the pixel value is increased due to thinning processing and smoothing processing.

In such way, when the surrounding pixel which is both thinned and smoothed is adjacent to the target pixel in the edge direction pos or in the opposite-edge direction apos, the pixel value deciding unit 53 decides the pixel value G[P] of when thinning processing and smoothing processing are realized at the same time on the surrounding pixel as well as the target pixel.

Because neither thinning nor smoothing is performed on the target pixel, the pixel value deciding unit 54 temporarily decides the original pixel value C[25] of the target pixel as the pixel value G[25] of the target pixel of when thinning processing and smoothing processing are realized at the same time as shown in FIG. 17 (step S61).

Subsequently, the pixel value deciding unit 54 determines whether three pixels which are the target pixel, the surrounding pixel adjacent to the target pixel in the edge direction pos and the surrounding pixel adjacent to the target pixel in the opposite-edge direction apos have nearly the same pixel values (step S62). This is because the pixel values of the three pixels which are the target pixel and the surrounding pixels adjacent to the target pixel in the edge direction pos and in the opposite-edge direction apos are nearly the same when the target pixel is an inner edge. If both of the value obtained by subtracting the pixel value C[apos] of the surrounding pixel adjacent to the target pixel in the opposite-edge direction apos from the pixel value C[pos] of the surrounding pixel adjacent to the target pixel in the edge direction pos and the value obtained by subtracting the pixel value C[25] of the target pixel from the pixel value C[pos] of the surrounding pixel adjacent to the target pixel in the edge direction pos are smaller than the threshold value Th3, the pixel value deciding unit 54 determines that the pixel values of the three pixels are nearly the same, and if either of the above values exceeds the threshold value Th3, the pixel value deciding unit 54 determines that the pixel values of the three pixels are not nearly the same.

If the pixel values of the three pixels are not nearly the same (step S62; N), the target pixel is not an inner edge but is located more inside than the inner edge, and thus the pixel value deciding unit 54 outputs the pixel value G[25] which was decided in step S61. If the target pixel is located more inside than the inner edge, the surrounding pixel adjacent to the target pixel is also located at the inner edge or more inside than the inner edge and thus it is not appropriate to perform thinning and smoothing on the surrounding pixel. Therefore, the pixel value deciding unit 54 mandatorily modifies the change amount of the surrounding pixel to dST[pos]=dST [apos]=0 (step S63), and invalidates thinning and smoothing.

If the pixel values of the three pixels are nearly the same (step S62;Y), the target pixel is an inner edge. The pixel value deciding unit 54 determines in which direction among the edge direction pos and the opposite-edge direction apos the thinned and smoothed surrounding pixel is adjacent to the target pixel (step S64).

If the edge direction pos, the change amounts dST[pos] and dSMT[pos] which are input with respect to the surrounding pixel adjacent to the target pixel in the edge direction pos meet pos≠0, dST[pos]≠0 and dSMT[pos]≠0 (step S64;Y), the pixel value deciding unit 54 determines that the thinned and smoothed surrounding pixel is adjacent to the target pixel in the edge direction pos (step S65).

If the opposite-edge direction apos, the change amounts dST[apos] and dSMT[apos] which are input with respect to the surrounding pixel adjacent to the target pixel in the opposite-edge direction apos meet apos≠0, dST[apos]≠0 and dSMT[apos]≠0 (step S64; N, S66; Y), the pixel value deciding unit 54 determines that the thinned and smoothed surrounding pixel is adjacent to the target pixel in the opposite-edge direction apos (step S67).

If none of the conditions is met (step S66; N), the pixel value deciding unit 54 determines that the thinned and smoothed surrounding pixel is not adjacent to the target pixel in the edge direction nor in the opposite-edge direction, and outputs the pixel value G[25] of the target pixel which was decided in step S61.

If it is specified that the thinned and smoothed surrounding pixel is adjacent to the target pixel in the edge direction pos, the pixel value deciding unit 54 decides the value which is obtained by adding the change amount dST[pos] due to thinning and the change amount dSMT[pos] due to smoothing to the pixel value C[pos] of the surrounding pixel as the pixel value G[pos] of the surrounding pixel of when thinning processing and smoothing processing are realized at the same time (step S68).

It is not natural if the pixel value G[pos] of the surrounding pixel becomes larger than the pixel value of the foreground due to thinning and smoothing. Therefore, if the decided pixel value G[pos] is larger than the pixel value C[2pos] of the surrounding pixel which is two pixels away from the target pixel in the edge direction pos (step S69;Y), the pixel value deciding unit 54 modifies the pixel value G[pos] of the surrounding pixel to the pixel value C[2pos] of the surrounding pixel which is two pixels away from the target pixel. In addition, the pixel value deciding unit 54 decides the value which is obtained by adding the rest of the pixel value G[pos]–C[2pos] which could not be processed in the surrounding pixel to the pixel value C[25] of the target pixel as the pixel value G[25] of the target pixel of when thinning processing and smoothing processing are realized at the same time (step S70).

In order to also keep the decided pixel value G[25] of the target pixel to be equal to or smaller than the pixel value of the foreground, if the decided pixel value G[25] of the target pixel is larger than the pixel value C[2pos] of the surrounding pixel which is two pixels away in the edge direction (step S71;Y), the pixel value deciding unit 54 further modifies the pixel value G[25] of the target pixel to the pixel value C[apos] of the surrounding pixel which is two pixels away from the target pixel (step S72).

On the other hand, if the thinned and smoothed surrounding pixel is specified to be adjacent to the target pixel in the opposite-edge direction apos, the pixel value deciding unit 54 decides the value which is obtained by adding the change amount dST[apos] due to thinning processing and the change amount dSMT[apos] due to smoothing processing to the pixel value C[apos] of the surrounding pixel as the pixel value G[apos] of the surrounding pixel of when thinning processing and smoothing processing are realized at the same time (step S73).

It is not natural if the pixel value G[apos] of the surrounding pixel becomes smaller than the pixel value of the background due to thinning and smoothing. Therefore, if the decided pixel value G[apos] is smaller than the pixel value C[2apos] of the surrounding pixel which is two pixels away from the target pixel in the opposite-edge direction (step S74; Y), the pixel value deciding unit 54 modifies the pixel value G[apos] of the surrounding pixel to the pixel value C[2apos] of the surrounding pixel which is two pixels away from the target pixel. In addition, the pixel value deciding unit 54 adds the rest of the pixel value G[apos]–C[2apos] which could not be processed in the surrounding pixel to the pixel value C[25] of the target pixel, and decides the obtained value as the pixel value G[25] of the target pixel (step S75).

In order to also keep the decided pixel value G[25] of the target pixel to be equal to or smaller than the pixel value of the background, if the decided pixel value G[25] of the target pixel is smaller than the pixel value C[2apos] of the surrounding pixel which is two pixels away in the opposite-edge direction (step S76; Y), the pixel value deciding unit 54 further modifies the pixel value G[25] of the target pixel to the pixel value C[2apos] of the surrounding pixel which is two pixels away from the target pixel (step S77).

Figure 19A:
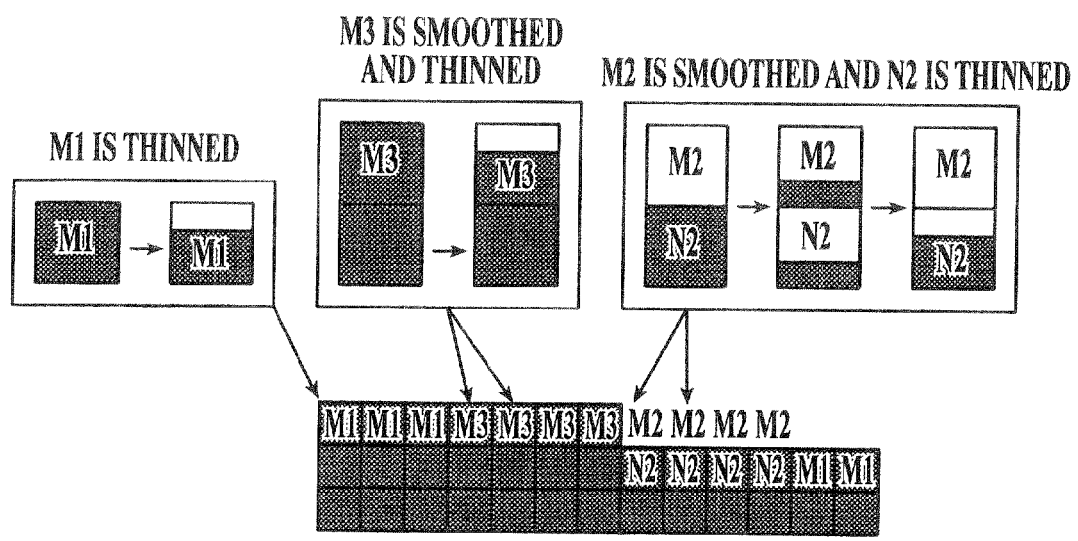
FIG. 19A is an image diagram of processing performed by the blending processing unit.

FIG. 19A is an image diagram of processing which is performed by the blending processing unit 5.

When thinning processing and smoothing processing are performed on the image shown in FIG. 19A, only the thinning is performed on the target pixels M1, and thus this is classified into case 2. Then, the pixel values of the target pixels M1 which are only thinned are output because neither thinning nor smoothing is performed on the surrounding pixels adjacent to the target pixel M1 in the edge direction and in the opposite-edge direction.

On the other hand, the target pixels M2 are smoothed and the surrounding pixels N2 adjacent respectively to the target pixels M2 in the edge direction are thinned. Therefore, this is classified into case 3. In each set of target pixel M2 and surrounding pixel N2, the pixel value obtained by adding the pixel value of the smoothed target pixel M2 and the pixel value of the thinned surrounding pixel N2 is distributed to the target pixel M2 and the surrounding pixel N2 so as to be shifted to the surrounding pixel N2 whose original pixel value is larger.

Both of smoothing and thinning are performed on the target pixels M3, and neither thinning nor smoothing is performed on the surrounding pixels adjacent respectively to the target pixels M3 in the edge direction or in the opposite-edge direction. Such case is classified into case 1, and the pixel values of the thinned and smoothed target pixels M3 are output.

Figure 19B:
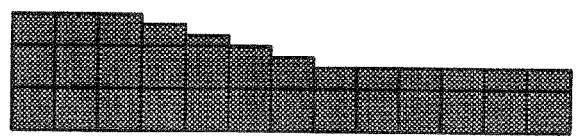
FIG. 19B is a diagram illustrating a processing result of the blending processing unit.

As a result, the straight line is thinned and the oblique line is smoothly stepped by smoothing to realize thinning and smoothing in a well balanced manner as shown in FIG. 19B.

In contrast to such a good processing result obtained by the blending processing unit 5, it is difficult to realize thinning and smoothing at the same time by a method of switching processing depending on the image structure so as to perform thinning processing for a straight line portion and smoothing processing for an oblique line portion and by a method of setting the pixel value which was changed at the time of smoothing processing to be a smaller value considering that thinning processing is to be also performed at the same time.

Figure 20A:
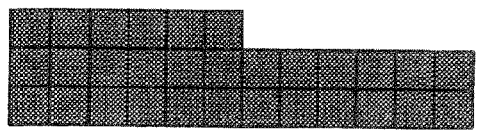
FIG. 20A is a diagram illustrating an original image.
Figure 20B:
FIG. 20B is a diagram illustrating a desired image when thinning processing and smoothing processing are performed at the same time.

FIG. 20A shows an original image. FIG. 20B shows a desired image to be realized when thinning processing and smoothing processing are performed at the same time on the original image.

Figure 20C:
FIG. 20C is a diagram illustrating a processing result when only smoothing processing is performed on the original image.
Figure 20D:
FIG. 20D is a diagram illustrating a processing result when only thinning processing is performed on the original image.

When only the smoothing processing is executed on the original image, pixel values of pixels which are located at the edge of the oblique line portion are increased to obtain a smooth oblique line as shown in FIG. 20C. When only the thinning processing is executed on the original image, pixel values of the straight line portion are decreased and the straight line portion is visually thinned as shown in FIG. 20D.

Figure 20E:
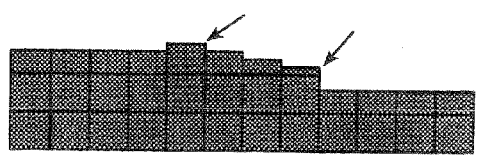
FIG. 20E is a diagram illustrating a processing result when processing is switched between smoothing processing and thinning processing depending on the image structure.

When both of smoothing processing and thinning processing are performed at the same time, it is expected that the oblique line portion becomes smooth and the pixel values of the edge of the straight line portion is decreased as the desired image shown in FIG. 20B. However, mere switching so as to perform smoothing processing for the oblique line portion and to perform thinning processing for the straight line portion generates unexpected steps at the points indicated by the arrows as shown in FIG. 20E, and thus the smooth oblique line cannot be realized.

Figure 20F:
FIG. 20F is a diagram illustrating a processing result when a pixel value is adjusted to be smaller in smoothing processing.

When the pixel value which was changed at the time of smoothing processing is set to be a smaller value considering that thinning processing is to be also performed at the same time, the processing result as shown in FIG. 20F is obtained. Though the result seems to be improved comparing to the processing result shown in FIG. 20E, a step is generated at the point indicated by the arrow and the image quality is degraded comparing to the desired image and the processing result obtained by the blending processing unit 5 according to the embodiment (see FIG. 19B).

As described above, according to the embodiment, the image processing apparatus 1 includes the smoothing processing unit 2 to perform smoothing processing on image data, the thinning processing unit 3 to perform thinning processing on the image data, the edge direction determination unit 4 to determine the edge direction for each pixel in the image data and the blending processing unit 5 to decide the pixel value of each pixel when the thinning processing and the smoothing processing are performed at the same time. The blending processing unit 5 uses each pixel value C of a target pixel and a surrounding pixel of the target pixel, the change amounts dSMT in pixel value due to smoothing processing, the change aounts dST in pixel value due to thinning processing and the edge direction pos which is determined with respect to the target pixel to decide the pixel value G[25] of the target pixel of when thinning processing and smoothing processing are performed at the same time according to the combination of whether thinning processing is performed on the target pixel or not and whether smoothing processing is performed on the target pixel or not.

In such way, smoothing processing and thinned processing are performed independently and the pixel value of the target pixel of when the thinning processing and the smoothing process are performed at the same time can be decided by using the change amount in pixel value obtained as a result of each processing. By performing the smoothing processing and the thinning processing independently, processing can be switched easily between smoothing processing and thinning processing in the image processing apparatus 1 which realizes the thinning processing and the smoothing processing at the same time.

In case 1 where the target pixel is thinned and smoothed, the blending processing unit 5 decides the value obtained by adding the change amount dST[25] in pixel value of the target pixel due to thinning processing and the change amount dSMT[25] in pixel value of the target pixel due to smoothing processing to the original pixel value C[25] of the target pixel as the pixel value G[25] of the target pixel of when the smoothing processing and the thinning processing are realized at the same time.

In case 2 where the target pixel is thinned but not smoothed, the blending processing unit 5 decides the value obtained by adding the change amount dST[25] in pixel value of the target pixel due to thinning processing to the original pixel value C[25] of the target pixel as the pixel value G[25] of the target pixel of when the thinning processing and the smoothing processing are realized at the same time.

In case 2, when a surrounding pixel which is not thinned but is smoothed is adjacent to the target pixel in the edge direction pos or in the opposite-edge direction apos, the blending processing unit 5 decides the value obtained by adding the change amount dST[25] in pixel value of the target pixel due to thinning processing and the change amount dSMT[P] in pixel value of the surrounding pixel due to smoothing processing to the original pixel value C[25] of the target pixel as the pixel value G[25] of the target pixel when thinning processing and smoothing processing are performed at the same time.

In both cases 1 and 2, when a surrounding pixel which is not thinned nor smoothed is adjacent to the target pixel in the edge direction pos, the blending processing unit 5 modifies the decided pixel value G[25] of the target pixel to the original pixel value C[pos] of the surrounding pixel which is adjacent to the target pixel in the edge direction pos if the decided pixel value G[25] of the target pixel is greater than the original pixel value C[pos] of the surrounding pixel which is adjacent to the target pixel in the edge direction pos. When a surrounding pixel which is not thinned nor smoothed is adjacent to the target pixel in the opposite-edge direction apos, the blending processing unit 5 modifies the decided pixel value G[25] of the target pixel to the original pixel value C[apos] of the surrounding pixel which is adjacent to the target pixel in the opposite-edge direction apos if the decided pixel value G[25] of the target pixel is smaller than the pixel value C[apos] of the surrounding pixel which is adjacent to the target pixel in the opposite-edge direction apos.

In case 3 where the target pixel is not thinned but is smoothed, the blending processing unit 5 decide the value obtained by adding the change amount dSMT[25] in pixel value of the target pixel due to smoothing processing to the pixel value C[25] of the target pixel as the pixel value G[25] of the target pixel of when thinning processing and smoothing processing are performed at the same time.

In case 3, when a surrounding pixel which is thinned but not smoothed is adjacent to the target pixel in the edge direction pos or in the opposite-edge direction apos, the blending processing unit 5 decides the pixel value G[P] of the surrounding pixel of when thinning processing and smoothing processing are realized at the same time as well as the pixel value of the target pixel. When the sum of the change amount dSMT[25] in pixel value of the target pixel due to smoothing processing and the change amount dST[P] in pixel value of the surrounding pixel due to thinning processing is a positive value, the blending processing unit 5 decides the original pixel value C[25] of the target pixel as the pixel value G[25] of the target pixel of when thinning processing and smoothing processing are realized at the same time and decides the value obtained by adding the change amount dST[P] in pixel value of the surrounding pixel due to thinning processing and the change amount dSMT[25] in pixel value of the target pixel due to smoothing processing to the original pixel value C[P] of the surrounding pixel as the pixel value G[P] of the surrounding pixel of when thinning processing and smoothing processing are realized at the same time if the original pixel value C[25] of the target pixel is larger than the original pixel value C[25] of the surrounding pixel, and the blending processing unit 5 decides the value obtained by adding the change amount dST[P] in pixel value of the surrounding pixel due to thinning processing and the change amount dSMT[25] in pixel value of the target pixel due to smoothing processing to the original pixel value C[25] of the target pixel as the pixel value G[25] of the target pixel of when thinning processing and smoothing processing are realized at the same time and decides the original pixel value C[P] of the surrounding pixel as the pixel value G[P] of the surrounding pixel of when thinning processing and smoothing processing are realized at the same time if the original pixel value C[25] of the target pixel is smaller than the original pixel value C[P] of the surrounding pixel.

In case 3, when the sum temp of the original pixel value C[25] of the target pixel, the original pixel value C[P] of the surrounding pixel, the change amount dSMT[25] in pixel value of the target pixel due to smoothing processing and the change amount dSMT[P] in pixel value of the surrounding pixel due to thinning processing is larger than twice the pixel value which is larger among t the original pixel values of the target pixel and the surrounding pixel, the blending processing unit 5 modifies the decided pixel values G[25] and G[P] of the target pixel and the surrounding pixel to the pixel value which is larger among the original pixel values of the target pixel and the surrounding pixel.

In case 3, when a surrounding pixel which is not thinned nor smoothed is adjacent to the target pixel in the edge direction pos or in the opposite-edge direction apos, the blending processing unit 5 decides the pixel value of the surrounding pixel of when thinning processing and smoothing processing are realized at the same time as well as the pixel value of the target pixel. When the sum of the change amount dSMT[25] in pixel value of the target pixel due to smoothing processing and the change amount dST[P] in pixel value of the surrounding pixel due to thinning processing is a negative value, the blending processing unit 5 decides the value obtained by adding the change amount dST[P] in pixel value of the surrounding pixel due to thinning processing and the change amount dSMT[25] in pixel value of the target pixel due to smoothing processing to the original pixel value C[25] of the target pixel as the pixel value G[25] of the target pixel of when thinning processing and smoothing processing are realized at the same time and decides the original pixel value C[P] of the surrounding pixel as the pixel value G[P] of the surrounding pixel of when thinning processing and smoothing processing are realized at the same time if the original pixel value C[25] of the target pixel is larger than the original pixel value C[P] of the surrounding pixel, and the blending processing unit 5 decides the original pixel value C[25] of the target pixel as the pixel value G[25] of the target pixel of when thinning processing and smoothing processing are realized at the same time and decides the value obtained by adding the change amount dST[P] in pixel value of the surrounding pixel due to thinning processing and the change amount dSMT[25] in pixel value of the target pixel due to smoothing processing to the pixel value C[P] of the surrounding pixel as the pixel value G[P] of the surrounding pixel of when thinning processing and smoothing processing are realized at the same time if the original pixel value C[25] of the target pixel is smaller than the original pixel value C[P] of the surrounding pixel.

In case 3, when the sum temp of the original pixel value C[25] of the target pixel, the original pixel value C[P] of the surrounding pixel, the change amount dST[P] in pixel value of surrounding pixel due to thinning processing and the change amount dSMT[25] in pixel value of the target pixel due to smoothing processing is smaller than twice the pixel value which is smaller among the original pixel values of the target pixel and the surrounding pixel, the blending processing unit 5 modifies the decided pixel values G[25] and G[P] of the target pixel and the surrounding pixel to the pixel value which is smaller among the original pixel values of the target pixel and the surrounding pixel.

In case 4 where the target pixel is not thinned nor smoothed, the blending processing unit 5 decides the original pixel value C[25] of the target pixel as the pixel value G[25] of the target pixel of when thinning processing and smoothing processing are realized at the same time if the pixel value C[pos] of the surrounding pixel which is adjacent to the target pixel in the edge direction pos and the pixel value C[apos] of the surrounding pixel which is adjacent to the target pixel in the opposite-edge direction apos are nearly the same as the pixel value C[25] of the target pixel.

In case 4, when the pixel value C[pos] of the surrounding pixel which is adjacent to the target pixe in the edge direction pos and the pixel value C[apos] of the surrounding pixel which is adjacent to the target pixel in the opposite-edge direction apos are not nearly the same as the pixel value C[25] of the target pixel and a thinned and smoothed surrounding pixel is adjacent to the target pixel in the edge direction pos, the blending processing unit 5 decides the pixel value of the surrounding pixel of when thinning processing and smoothing processing are realized at the same time as well as the pixel value of the target pixel. The blending processing unit 5 decides the original pixel value C[25] of the pixel value as the pixel value G[25] of the target pixel of then thinning processing and smoothing processing are realized at the same time and decides the value obtained by adding the change amount dST[pos] in pixel value of the surrounding pixel due to thinning processing and the change amount dSMT[pos] in pixel value of the surrounding pixel due to smoothing processing to the original pixel value C[pos] of the surrounding pixel as the pixel value G[pos] of the surrounding pixel of when thinning processing and smoothing processing are realized at the same time.

In case 4, when the decided pixel value G[pos] of the surrounding pixel is larger than the pixel value C[2pos] of the surrounding pixel which is two pixels away from the target pixel in the edge direction pos, the blending processing unit 5 modifies the decided pixel value G[pos] of the surrounding pixel to the pixel value C[2pos] of the surrounding pixel which is two pixels away from the target pixel in the edge direction and modifies the decided pixel value G[25] of the target pixel to the value obtained by adding the value which is obtained by subtracting the pixel value C[2pos] of the surrounding pixel which is two pixels away from the target pixel in the edge direction pos from the decided pixel value G[pos] of the surrounding pixel to the original pixel value C[25] of the target pixel. When the modified pixel value G[25] is larger than the pixel value C[2pos] of the surrounding pixel (first surrounding pixel) two pixels away in the edge direction pos, the pixel value G[25] is further modified to the pixel value C[2pos] of surrounding pixel (second surrounding pixel) two pixels away in the edge direction.

In case 4, when the pixel value C[pos] of the surrounding pixel which is adjacent to the pixel value in the edge direction pos and the pixel value C[apos] of the surrounding pixel which is adjacent to the target pixel in the opposite-edge direction apos are not nearly the same as the pixel value of the target pixel and a thinned and smoothed surrounding pixel is adjacent to the target pixel in the opposite-edge direction apos, the blending processing unit 5 decides the pixel value of the surrounding pixel of when thinning processing and smoothing processing are realized at the same time as well as the pixel value to the target pixel. The blending processing unit 5 decides the original pixel value C[25] of the target pixel as the pixel value G[25] of the target pixel of when thinning processing and smoothing processing are realized at the same time and decides the value obtained by adding the change amount dST[pos] in pixel value of the surrounding pixel due to thinning processing and the change amount dSMT[pos] in pixel value of the surrounding pixel due to smoothing processing to the original pixel value C[apos] of the surrounding pixel as the pixel value G[apos] of the surrounding pixel of when thinning processing and smoothing processing are realized at the same time.

In case 4, when the decided pixel value G[apos] of the surrounding pixel is smaller than the pixel value C[2apos] of the surrounding pixel which is two pixels away from the target pixel in the opposite-edge direction apos, the blending processing unit 5 modifies the decided pixel value G[pos] of the surrounding pixel to the pixel value C[2apos] of the surrounding pixel which is two pixels away in the opposite-edge direction apos and modifies the decided pixel value C[25] of the target pixel to the value obtained by adding the value which is obtained by subtracting the pixel value C[2apos] of the surrounding pixel which is two pixels away in the opposite-edge direction apos from the decided pixel value G[apos] of the surrounding pixel to the original pixel value C[25] of the target pixel. When the modified pixel value G[25] is smaller than the pixel value C[2apos] of the surrounding pixel (first surrounding pixel) two pixels away in the opposite-edge direction apos, the blending processing unit 5 further modifies the pixel value G[25] to the pixel value C[2apos] of the surrounding pixel (second surrounding pixel) two pixels away in the opposite-edge direction apos.

In such way, pixel values can be adjusted in two pixels, which are a target pixel and a surrounding pixel, according to whether thinning and smoothing are performed or not on the surrounding pixel which is adjacent to the target pixel, and the thinning and smoothing can be realized in a well balanced manner. Further, because modifications in pixel values are carried out by taking the densities of foreground and background into consideration, the foreground and background can be reproduced naturally even after the thinning and smoothing.

Here the above described embodiment is a preferred embodiment of the present invention, and the present invention is not limited to this.

For example, the processing methods of thinning processing and smoothing processing are not limited to the above described processing methods, and can be any other processing method as long as the change amounts in pixel value due to thinning processing and the change amounts in pixel value due to smoothing processing are output.

Further, the thinning processing unit 3 and the smoothing processing unit 2 calculates the change amounts dST and dSMT, respectively, to be used by the blending processing unit 5. However, pixel values of after processing can be output from the smoothing processing unit 2 and the thinning processing unit 3 so that the blending processing unit 5 can calculate the change amounts dST and dSMT by subtracting the original pixel value from the pixel value after processing.

Moreover, the processing contents of each unit such as the blending processing unit may be programmed and software processing may be performed by cooperation between su program and CPU and the like. Then, as a computer readable medium of the program, a non-volatile memory such as ROM and a flash memory and a portable recording medium such as CD-ROM and be used. Also, as a medium for providing program data via a communication line, carrier wave is also used in the present invention.

According to one aspect of the present invention an image processing apparatus includes a smoothing processing unit which performs smoothing processing on image data, a thinning processing unit which performs thinning processing on the image data, an edge direction determination unit which determines an edge direction with respect to each pixel of the image data and a blending processing unit which decides a pixel value of each pixel of when the thinning processing and the smoothing processing are realized at same time, and the blending processing unit decides a pixel value of a target pixel of when the thinning processing and the smoothing processing are realized at the same time depending on a combination of whether the thinning processing is performed or not and whether the smoothing processing is performed or not on the target pixel by using pixel values of the target pixel and a surrounding pixel of the target pixel, change amounts in pixel value due to the smoothing processing, change amounts in pixel value due to the thinning processing and the edge direction which is determined with respect to the target pixel.

According to the present invention, the smoothing processing and the thinning processing are performed independently and the pixel value of the target pixel of when the thinning processing and the smoothing processing are realized at the same time can be decided by using the change amounts in pixel values obtained as processing results of the two processing. By performing the smoothing processing and the thinning processing independently, switching between processing of the smoothing processing and the thinning processing can be carried out easily in the image processing apparatus which realizes the thinning processing and the smoothing processing as the same time.

Preferably, when the target pixel is thinned and smoothed, the blending processing unit decides a value obtained by adding a change amount in pixel value of the target pixel due to the thinning processing and a change amount in pixel value of the target pixel due to the smoothing processing to an original pixel value of the target pixel as a pixel value of the target pixel of when the thinning processing and the smoothing processing are realized at the same time.

Preferably, when the target pixel is thinned but not smoothed, the blending processing unit decides a value obtained by adding a change value in pixel value of the target pixel due to the thinning processing to an original pixel value of the target pixel as a pixel value of the target pixel of when the thinning processing and the smoothing processing are realized at the same time.

Preferably, when a surrounding pixel which is not thinned but is smoothed is adjacent to the target pixel in the edge direction or an opposite-edge direction, the blending processing unit decides a value obtained by adding the change amount in pixel value of the target pixel due to the thinning processing and a change amount in pixel value of the surrounding pixel due to the smoothing processing to the original pixel value of the target pixel as a pixel value of when the thinning processing and the smoothing processing are realized at the same time.

Preferably, the blending processing unit (1) modifies the decided pixel value of the target pixel to an original pixel value of a surrounding pixel which is adjacent to the edge direction when the decided pixel value of the target pixel is larger than the original pixel value of the surrounding pixel which is adjacent to the target pixel in the edge direction and (2) modifies the decided pixel value of the target pixel to an original pixel value of a surrounding pixel which is adjacent to the target pixel in an opposite-edge direction when the decided pixel value of the target pixel is smaller than the original pixel value of the surrounding pixel which is adjacent to the target pixel in the opposite-edge direction.

Preferably, when the target pixel is not thinned but is smoothed, the blending processing unit decides a value obtained by adding a change amount in pixel value of the target pixel due to the smoothing processing to an original pixel value of the target pixel as a pixel value of the target pixel of when the thinning processing and the smoothing processing are realized at the same time.

Preferably, when a surrounding pixel which is thinned but not smoothed is adjacent to the target pixel in the edge direction or an opposite-edge direction, the blending processing unit decides a pixel value of the surrounding pixel of when the thinning processing and the smoothing processing are realized at the same time as well as the pixel value of the target pixel, when a sum of the change amount in pixel value of the target pixel due to the smoothing processing and a change amount in pixel value of the surrounding pixel due to the thinning processing is a positive value, the blending processing unit (1) decides the original pixel value of the target pixel as the pixel value of the target pixel of when the thinning processing and the smoothing processing are realized at the same time and decides a value obtained by adding a change amount in pixel value of the surrounding pixel due to the thinning processing and the change amount in pixel value of the target pixel due to the smoothing processing to an original pixel value of the surrounding pixel as the pixel value of the surrounding pixel of when the thinning processing and the smoothing processing are realized at the same time when the original pixel value of the target pixel is larger than the original pixel value of the surrounding pixel, and (2) decides a value obtained by adding the change amount in pixel value of the surrounding pixel due to the thinning processing and the change amount in pixel value of the target pixel due to the smoothing processing to the original pixel value of the target pixel as the pixel value of the target pixel of when the thinning processing and the smoothing processing are realized at the same time and decides the original pixel value of the surrounding pixel as the pixel value of the surrounding pixel of when the thinning processing and the smoothing processing are realized at the same time when the original pixel value of the target pixel is smaller than the original pixel value of the surrounding pixel.

Preferably, when a sum of the original pixel value of the target pixel, the original pixel value of the surrounding pixel, the change amount in pixel value of the target pixel due to the smoothing processing and the change amount in pixel value of the surrounding pixel due to the thinning processing is larger than twice a pixel value which is larger among the original pixel values of the target pixel and the surrounding pixel, the blending processing unit modifies the decided pixel values of the target pixel and the surrounding pixel to the pixel value which is larger among the original pixel values of the target pixel and the surrounding pixel.

Preferably, when a surrounding pixel which is thinned but not smoothed is adjacent to the target pixel in the edge direction or in an opposite-edge direction, the blending processing unit decides a pixel value of the surrounding pixel of when the thinning processing and the smoothing processing are realized at the same time as well as the pixel value of the target pixel, when a sum of the change amount in pixel value of the target pixel due to the smoothing processing and a change amount in pixel value of the surrounding pixel due to the thinning processing is a negative value, the blending processing unit (1) decides a value obtained by adding a change amount in pixel value of the surrounding pixel due to the thinning processing and the change amount in pixel value of the target pixel due to the smoothing processing to the original pixel value of the target pixel as the pixel value of the target pixel of when the thinning processing and the smoothing processing are realized at the same time and decides an original pixel value of the surrounding pixel as the pixel value of the surrounding pixel of when the thinning processing and the smoothing processing are realized at the same time when the original pixel value of the target pixel is larger than the original pixel value of the surrounding pixel, and (2) decides the original pixel value of the target pixel as the pixel value of the target pixel of when the thinning processing and the smoothing processing are realized at the same time and decides a value obtained by adding the change amount in pixel value of the surrounding pixel due to the thinning processing and the change amount in pixel value of the target pixel due to the smoothing processing to the original pixel value of the surrounding pixel as the pixel value of the surrounding pixel of when the thinning processing and the smoothing processing are realized at the same time when the original pixel value of the target pixel is smaller than the original pixel value of the surrounding pixel.

Preferably, when a sum of the original pixel value of the target pixel, the original pixel value of the surrounding pixel, the change amount in pixel value of the surrounding pixel due to the thinning processing and the change amount in pixel value of the target pixel due to the smoothing processing is smaller than twice a pixel value which is smaller among the original pixel values of the target pixel and the surrounding pixel, the blending processing unit modifies the decided pixel values of the target pixel and the surrounding pixel to the pixel value which is smaller among the original pixel values of the target pixel and the surrounding pixel.

Preferably, when the target pixel is not thinned nor smoothed, the blending processing unit decides an original pixel value of the target pixel as the pixel value of the target pixel of when the thinning processing and the smoothing processing are realized at the same time if a pixel value of the surrounding pixel which is adjacent to the target pixel in the edge direction and a pixel value of the surrounding pixel which is adjacent to the target pixel in an opposite-edge direction are nearly same as the pixel value to the target pixel.

Preferably, when the pixel values of the target pixel and the surrounding pixels which are adjacent to the target pixel in the edge direction and the opposite-edge direction are not approximately same and a surrounding pixel which is thinned and smoothed is adjacent to the target pixel in the edge direction, the blending processing unit decides the pixel value of the surrounding pixel of when the thinning processing and the smoothing processing are realized at the same time as well as the pixel value of the target pixel, and the blending processing unit (1) decides the original pixel value of the target pixel as the pixel value of the target pixel of when the thinning processing and the smoothing processing are realized at the same time and (2) decides a value obtained by adding a change amount in pixel value of the surrounding pixel due to the thinning processing and a change amount in pixel value of the surrounding pixel due to the smoothing processing to an original pixel value of the surrounding pixel as the pixel value of the surrounding pixel of when the thinning processing and the smoothing processing are realized at the same time.

Preferably, when the decided pixel value of the surrounding pixel is larger than a pixel value of a first surrounding pixel two pixels away from the target pixel in the edge direction, the blending processing unit (1) modifies the decided pixel value of the surrounding pixel to the pixel value of the first surrounding pixel two pixels away from the target pixel in the edge direction and (2) modifies the decided pixel value of the target pixel to a value obtained by adding a value which is obtained by subtracting the pixel value of the first surrounding pixel two pixels away in the edge direction from the decided pixel value of the surrounding pixel to the original pixel value of the target pixel and further modifies to a pixel value of a second surrounding pixel two pixels away in the edge direction when the modified pixel value is larger than the pixel value of the first surrounding pixel two pixels away in the edge direction.

Preferably, when the pixel values of the target pixel and the surrounding pixels which are adjacent to the target pixel in the edge direction and the opposite-edge direction are not approximately same and a surrounding pixel which is thinned and smoothed is adjacent to the target pixel in the opposite-edge direction, the blending processing unit decides the pixel value of the surrounding pixel of when the thinning processing and the smoothing processing are realized at the same time as well as the pixel value of the target pixel, and the blending processing unit (1) decides the original pixel value of the target pixel as the pixel value of the target pixel of which the thinning processing and the smoothing processing are realized at the same time and (2) decides a value obtained by adding a change amount in pixel value of the surrounding pixel due to the thinning processing and a change amount in pixel value of the surrounding pixel due to the smoothing processing to an original pixel value of the surrounding pixel as the pixel value of the surrounding pixel of when the thinning processing and the smoothing processing are realized at the same time.

Preferably, when the decided pixel value of the surrounding pixel is smaller than a pixel value of a first surrounding pixel two pixels away from the target pixel in the edge direction, the blending processing (1) modifies the decided pixel value of the surrounding pixel to the pixel value of the first surrounding pixel two pixels away in the opposite-edge direction and (2) modifies the decided pixel value of the target pixel to a value which is obtained by adding a value which is obtained by subtraction the pixel value of the first surrounding pixel two pixels away in the edge direction from the decided pixel value of the surrounding pixel to the original pixel value of the target pixel, and further modifies the modified pixel value to a pixel value of a second surrounding pixel two pixels away in the opposite-edge direction when the modified pixel value is smaller than the pixel value of the first surrounding pixel two pixels away in the opposite-edge direction.

According the other aspect of the present invention, an image processing method includes smoothing of image data, thinning of the image data, determining an edge direction with respect to each pixel of the image data and blending to decide a pixel value of each pixel of when the thinning processing and the smoothing processing are realized at same time, and in the blending, a pixel value of a target pixel of when the thinning processing and the smoothing processing are realized at the same time is decided depending on a combination of whether the thinning processing is performed or not and whether the smoothing processing is performed or not on the target pixel by using pixel values of the target pixel and a surrounding pixel of the target pixel, change amounts in pixel value due to the smoothing processing, change amounts in pixel value due to the thinning processing and the edge direction which is determined with respect to the target pixel.

According to the present invention, the smoothing processing and the thinning processing are performed independently and the pixel value of the target pixel of when the thinning processing and the smoothing processing are realized at the same time can be decided by using the change amounts in pixel values obtained as processing results of the two processing. By performing the smoothing processing and the thinning processing independently, switching between processing of the smoothing processing and the thinning processing can be carried out easily in the image processing apparatus which realizes the thinning processing and the smoothing processing as the same time.

Preferably, when the target pixel is thinned and smoothed, a value obtained by adding a change amount in pixel value of the target pixel due to the thinning processing and a change amount in pixel value of the target pixel due to the smoothing processing to an original pixel value of the target pixel is decided as a pixel value of the target pixel of when the thinning processing and the smoothing processing are realized at the same time in the blending.

Preferably, when the target pixel is thinned but not smoothed, a value obtained by adding a change value in pixel value of the target pixel due to the thinning processing to an original pixel value of the target pixel is decided as a pixel value of the target pixel of when the thinning processing and the smoothing processing are realized at the same time in the blending.

Preferably, when the target pixel is not thinned but is smoothed, a value obtained by adding a change amount in pixel value of the target pixel due to the smoothing processing to an original pixel value of the target pixel is decided as a pixel value of the target pixel of when the thinning processing and the smoothing processing are realized at the same time in the blending.

Preferably, when the target pixel is not thinned nor smoothed, an original pixel value of the target pixel is decided as a pixel value of the target pixel of when the thinning processing and the smoothing processing are realized at the same time in the blending if a pixel value of a surrounding pixel which is adjacent to the target pixel in the edge direction and a pixel value of a surrounding pixel which is adjacent to the target pixel in an opposite-edge direction are approximately same as the pixel value of the target pixel.

The entire disclosure of Japanese Patent Application No. 2011-143682 filed on Jun. 29, 2011 including description, claims, drawings, and abstract are incorporated herein by reference in its entirety.

What is claimed is:

1. An image processing apparatus comprising a CPU operable as units comprising:
   a smoothing processing unit which performs smoothing processing on image data;
   a thinning processing unit which performs thinning processing on the image data;
   an edge direction determination unit which determines an edge direction with respect to each pixel of the image data; and
   a blending processing unit which decides a pixel value of each pixel when the thinning processing and the smoothing processing are realized at a same time,
   wherein the blending processing unit decides a pixel value of a target pixel when the thinning processing and the smoothing processing are realized at the same time based on a combination of whether the thinning processing is performed or not and whether the smoothing processing is performed or not on the target pixel by using pixel values of the target pixel and a surrounding pixel of the target pixel, change amounts in pixel value due to the smoothing processing, change amounts in pixel value due to the thinning processing, and the edge direction which is determined with respect to the target pixel, wherein when the target pixel is not thinned nor smoothed, the blending processing unit decides an original pixel value of the target pixel as the pixel value of the target pixel when the thinning processing and the smoothing processing are realized at the same time if a pixel value of the surrounding pixel which is adjacent to the target pixel in the edge direction and a pixel value of the surrounding pixel which is adjacent to the target pixel in an opposite-edge direction are nearly the same as the pixel value of the target pixel, wherein when the pixel values of the target pixel and the surrounding pixels which are adjacent to the target pixel in the edge direction and the opposite-edge direction are not approximately the same and a surrounding pixel which is thinned and smoothed is adjacent to the target pixel in the edge direction, the blending processing unit decides the pixel value of the surrounding pixel when the thinning processing and the smoothing processing are realized at the same time as well as the pixel value of the target pixel, and wherein the blending processing unit (1) decides the original pixel value of the target pixel as the pixel value of the target pixel when the thinning processing and the smoothing processing are realized at the same time and (2) decides a value obtained by adding a change amount in pixel value of the surrounding pixel due to the thinning processing and a change amount in pixel value of the surrounding pixel due to the smoothing processing to an original pixel value of the surrounding pixel as the pixel value of the surrounding pixel when the thinning processing and the smoothing processing are realized at the same time.

2. The image processing apparatus according to claim 1, wherein when the decided pixel value of the surrounding pixel is larger than a pixel value of a first surrounding pixel two pixels away from the target pixel in the edge direction, the blending processing unit:
(1) modifies the decided pixel value of the surrounding pixel to the pixel value of the first surrounding pixel two pixels away from the target pixel in the edge direction and (2) modifies the decided pixel value of the target pixel to a value obtained by adding a value which is obtained by subtracting the pixel value of the first surrounding pixel two pixels away in the edge direction from the decided pixel value of the surrounding pixel to the original pixel value of the target pixel and further modifies to a pixel value of a second surrounding pixel two pixels away in the edge direction when the modified pixel value is larger than the pixel value of the first surrounding pixel two pixels away in the edge direction.

3. The image processing apparatus according to claim 2, wherein when the decided pixel value of the surrounding pixel is smaller than a pixel value of a first surrounding pixel two pixels away from the target pixel in the edge direction, the blending processing:
(1) modifies the decided pixel value of the surrounding pixel to the pixel value of the first surrounding pixel two pixels away in the opposite-edge direction and (2) modifies the decided pixel value of the target pixel to a value which is obtained by adding a value which is obtained by subtracting the pixel value of the first surrounding pixel two pixels away in the edge direction from the decided pixel value of the surrounding pixel to the original pixel value of the target pixel, and further modifies the modified pixel value to a pixel value of a second surrounding pixel two pixels away in the opposite-edge direction when the modified pixel value is smaller than the pixel value of the first surrounding pixel two pixels away in the opposite-edge direction.

4. An image processing apparatus comprising a CPU operable as units comprising:
a smoothing processing unit which performs smoothing processing on image data;
a thinning processing unit which performs thinning processing on the image data;
an edge direction determination unit which determines an edge direction with respect to each pixel of the image data; and
a blending processing unit which decides a pixel value of each pixel when the thinning processing and the smoothing processing are realized at a same time,
wherein the blending processing unit decides a pixel value of a target pixel when the thinning processing and the smoothing processing are realized at the same time based on a combination of whether the thinning processing is performed or not and whether the smoothing processing is performed or not on the target pixel by using pixel values of the target pixel and a surrounding pixel of the target pixel, change amounts in pixel value due to the smoothing processing, change amounts in pixel value due to the thinning processing, and the edge direction which is determined with respect to the target pixel,
wherein when the target pixel is thinned but not smoothed, the blending processing unit decides a value obtained by adding a change value in pixel value of the target pixel due to the thinning processing to an original pixel value of the target pixel as a pixel value of the target pixel when the thinning processing and the smoothing processing are realized at the same time, and
wherein when a surrounding pixel which is not thinned but is smoothed is adjacent to the target pixel in the edge direction or an opposite-edge direction, the blending processing unit decides a value obtained by adding the change amount in pixel value of the target pixel due to the thinning processing and a change amount in pixel value of the surrounding pixel due to the smoothing processing to the original pixel value of the target pixel as a pixel value when the thinning processing and the smoothing processing are realized at the same time.

5. An image processing apparatus comprising a CPU operable as units comprising:
a smoothing processing unit which performs smoothing processing on image data;
a thinning processing unit which performs thinning processing on the image data;
an edge direction determination unit which determines an edge direction with respect to each pixel of the image data; and
a blending processing unit which decides a pixel value of each pixel when the thinning processing and the smoothing processing are realized at a same time,
wherein the blending processing unit decides a pixel value of a target pixel when the thinning processing and the smoothing processing are realized at the same time based on a combination of whether the thinning processing is performed or not and whether the smoothing processing is performed or not on the target pixel by using pixel values of the target pixel and a surrounding pixel of the target pixel, change amounts in pixel value due to the smoothing processing, change amounts in pixel value due to the thinning processing, and the edge direction which is determined with respect to the target pixel, wherein when the target pixel is thinned and smoothed, the blending processing unit decides a value obtained by adding a change amount in pixel value of the target pixel due to the thinning processing and a change amount in pixel value of the target pixel due to the smoothing processing to an original pixel value of the target pixel as a pixel value of the target pixel when the thinning processing and the smoothing processing are realized at the same time, and wherein the blending processing unit (1) modifies the decided pixel value of the target pixel to an original pixel value of a surrounding pixel which is adjacent to the edge direction when the decided pixel value of the target pixel is larger than the original pixel value of the surrounding pixel which is adjacent to the target pixel in the edge direction and (2) modifies the decided pixel value of the target pixel to an original pixel value of a surrounding pixel which is adjacent to the target pixel in an opposite-edge direction when the decided pixel value of the target pixel is smaller than the original pixel value of the surrounding pixel which is adjacent to the target pixel in the opposite-edge direction.

6. An image processing apparatus comprising a CPU operable as units comprising:
  a smoothing processing unit which performs smoothing processing on image data;
  a thinning processing unit which performs thinning processing on the image data;
  an edge direction determination unit which determines an edge direction with respect to each pixel of the image data; and
  a blending processing unit which decides a pixel value of each pixel when the thinning processing and the smoothing processing are realized at a same time,
  wherein the blending processing unit decides a pixel value of a target pixel when the thinning processing and the smoothing processing are realized at the same time based on a combination of whether the thinning processing is performed or not and whether the smoothing processing is performed or not on the target pixel by using pixel values of the target pixel and a surrounding pixel of the target pixel, change amounts in pixel value due to the smoothing processing, change amounts in pixel value due to the thinning processing, and the edge direction which is determined with respect to the target pixel,
  wherein when the target pixel is not thinned but is smoothed, the blending processing unit decides a value obtained by adding a change amount in pixel value of the target pixel due to the smoothing processing to an original pixel value of the target pixel as a pixel value of the target pixel when the thinning processing and the smoothing processing are realized at the same time,
  wherein when a surrounding pixel which is thinned but not smoothed is adjacent to the target pixel in the edge direction or an opposite-edge direction, the blending processing unit decides a pixel value of the surrounding pixel when the thinning processing and the smoothing processing are realized at the same time as well as the pixel value of the target pixel, and
  wherein when a sum of the change amount in pixel value of the target pixel due to the smoothing processing and a change amount in pixel value of the surrounding pixel due to the thinning processing is a positive value, the blending processing unit:
    (1) decides the original pixel value of the target pixel as the pixel value of the target pixel when the thinning processing and the smoothing processing are realized at the same time and decides a value obtained by adding a change amount in pixel value of the surrounding pixel due to the thinning processing and the change amount in pixel value of the target pixel due to the smoothing processing to an original pixel value of the surrounding pixel as the pixel value of the surrounding pixel when the thinning processing and the smoothing processing are realized at the same time when the original pixel value of the target pixel is larger than the original pixel value of the surrounding pixel, and
    (2) decides a value obtained by adding the change amount in pixel value of the surrounding pixel due to the thinning processing and the change amount in pixel value of the target pixel due to the smoothing processing to the original pixel value of the target pixel as the pixel value of the target pixel when the thinning processing and the smoothing processing are realized at the same time and decides the original pixel value of the surrounding pixel as the pixel value of the surrounding pixel when the thinning processing and the smoothing processing are realized at the same time when the original pixel value of the target pixel is smaller than the original pixel value of the surrounding pixel.

7. The image processing apparatus according to claim 6, wherein when a sum of the original pixel value of the target pixel, the original pixel value of the surrounding pixel, the change amount in pixel value of the target pixel due to the smoothing processing and the change amount in pixel value of the surrounding pixel due to the thinning processing is larger than twice a pixel value which is larger among the original pixel values of the target pixel and the surrounding pixel, the blending processing unit modifies the decided pixel values of the target pixel and the surrounding pixel to the pixel value which is larger among the original pixel values of the target pixel and the surrounding pixel.

8. An image processing apparatus comprising a CPU operable as units comprising:
  a smoothing processing unit which performs smoothing processing on image data;
  a thinning processing unit which performs thinning processing on the image data;
  an edge direction determination unit which determines an edge direction with respect to each pixel of the image data; and
  a blending processing unit which decides a pixel value of each pixel when the thinning processing and the smoothing processing are realized at a same time,
  wherein the blending processing unit decides a pixel value of a target pixel when the thinning processing and the smoothing processing are realized at the same time based on a combination of whether the thinning processing is performed or not and whether the smoothing processing is performed or not on the target pixel by using pixel values of the target pixel and a surrounding pixel of the target pixel, change amounts in pixel value due to the smoothing processing, change amounts in pixel value due to the thinning processing, and the edge direction which is determined with respect to the target pixel,
  wherein when the target pixel is not thinned but is smoothed, the blending processing unit decides a value obtained by adding a change amount in pixel value of the target pixel due to the smoothing processing to an original pixel value of the target pixel as a pixel value of the target pixel when the thinning processing and the smoothing processing are realized at the same time, wherein when a surrounding pixel which is thinned but not smoothed is adjacent to the target pixel in the edge direction or in an opposite-edge direction, the blending processing unit decides a pixel value of the surrounding pixel when the thinning processing and the smoothing processing are realized at the same time as well as the pixel value of the target pixel, and wherein when a sum of the change amount in pixel value of the target pixel due to the smoothing processing and a change amount in pixel value of the surrounding pixel due to the thinning processing is a negative value, the blending processing unit:

(1) decides a value obtained by adding a change amount in pixel value of the surrounding pixel due to the thinning processing and the change amount in pixel value of the target pixel due to the smoothing processing to the original pixel value of the target pixel as the pixel value of the target pixel when the thinning processing and the smoothing processing are realized at the same time and decides an original pixel value of the surrounding pixel as the pixel value of the surrounding pixel when the thinning processing and the smoothing processing are realized at the same time when the original pixel value of the target pixel is larger than the original pixel value of the surrounding pixel, and (2) decides the original pixel value of the target pixel as the pixel value of the target pixel when the thinning processing and the smoothing processing are realized at the same time and decides a value obtained by adding the change amount in pixel value of the surrounding pixel due to the thinning processing and the change amount in pixel value of the target pixel due to the smoothing processing to the original pixel value of the surrounding pixel as the pixel value of the surrounding pixel when the thinning processing and the smoothing processing are realized at the same time when the original pixel value of the target pixel is smaller than the original pixel value of the surrounding pixel.

9. The image processing apparatus according to claim 8, wherein when a sum of the original pixel value of the target pixel, the original pixel value of the surrounding pixel, the change amount in pixel value of the surrounding pixel due to the thinning processing and the change amount in pixel value of the target pixel due to the smoothing processing is smaller than twice a pixel value which is smaller among the original pixel values of the target pixel and the surrounding pixel, the blending processing unit modifies the decided pixel values of the target pixel and the surrounding pixel to the pixel value which is smaller among the original pixel values of the target pixel and the surrounding pixel.

10. An image processing apparatus comprising a CPU operable as units comprising:

a smoothing processing unit which performs smoothing processing on image data;

a thinning processing unit which performs thinning processing on the image data;

an edge direction determination unit which determines an edge direction with respect to each pixel of the image data; and a blending processing unit which decides a pixel value of each pixel when the thinning processing and the smoothing processing are realized at a same time, wherein the blending processing unit decides a pixel value of a target pixel when the thinning processing and the smoothing processing are realized at the same time based on a combination of whether the thinning processing is performed or not and whether the smoothing processing is performed or not on the target pixel by using pixel values of the target pixel and a surrounding pixel of the target pixel, change amounts in pixel value due to the smoothing processing, change amounts in pixel value due to the thinning processing, and the edge direction which is determined with respect to the target pixel, wherein when the target pixel is not thinned nor smoothed, the blending processing unit decides an original pixel value of the target pixel as the pixel value of the target pixel when the thinning processing and the smoothing processing are realized at the same time if a pixel value of the surrounding pixel which is adjacent to the target pixel in the edge direction and a pixel value of the surrounding pixel which is adjacent to the target pixel in an opposite-edge direction are nearly the same as the pixel value of the target pixel, wherein when the pixel values of the target pixel and the surrounding pixels which are adjacent to the target pixel in the edge direction and the opposite-edge direction are not approximately the same and a surrounding pixel which is thinned and smoothed is adjacent to the target pixel in the opposite-edge direction, the blending processing unit decides the pixel value of the surrounding pixel when the thinning processing and the smoothing processing are realized at the same time as well as the pixel value of the target pixel, and wherein the blending processing unit (1) decides the original pixel value of the target pixel as the pixel value of the target pixel of which the thinning processing and the smoothing processing are realized at the same time and (2) decides a value obtained by adding a change amount in pixel value of the surrounding pixel due to the thinning processing and a change amount in pixel value of the surrounding pixel due to the smoothing processing to an original pixel value of the surrounding pixel as the pixel value of the surrounding pixel when the thinning processing and the smoothing processing are realized at the same time.

* * * * *